(12) United States Patent
Kawazu

(10) Patent No.: US 8,983,115 B2
(45) Date of Patent: Mar. 17, 2015

(54) DETECTING ALTERATION OF AN IMAGE BASED ON PATTERN INFORMATION OF COLOR FILTER ARRAY

(71) Applicant: Canon Kabushiki Kaisha, Tokyo (JP)

(72) Inventor: Ayuta Kawazu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 13/755,832

(22) Filed: Jan. 31, 2013

(65) Prior Publication Data

US 2013/0223731 A1   Aug. 29, 2013

(30) Foreign Application Priority Data

Feb. 27, 2012   (JP) ................... 2012-040667
Jan. 22, 2013   (JP) ................... 2013-009618

(51) Int. Cl.
*G06K 9/00* (2006.01)
*G06K 9/46* (2006.01)
*G06T 1/00* (2006.01)

(52) U.S. Cl.
CPC ............... *G06K 9/46* (2013.01); *G06T 1/0028* (2013.01); *G06K 2009/00583* (2013.01); *G06T 2201/0201* (2013.01)
USPC .......................................... 382/100; 382/165

(58) Field of Classification Search
None
See application file for complete search history.

(56) References Cited

U.S. PATENT DOCUMENTS

| | | | |
|---|---|---|---|
| 5,053,861 A * | 10/1991 | Tsai et al. .................. | 348/231.6 |
| 7,027,091 B1 * | 4/2006 | Reyneri et al. ............... | 348/280 |
| 7,627,172 B2 | 12/2009 | Urano et al. | |
| 8,189,012 B2 | 5/2012 | Yang et al. | |
| 8,441,562 B1 * | 5/2013 | Szedo et al. .................. | 348/280 |
| 8,761,504 B2 * | 6/2014 | Hirakawa et al. ............. | 382/167 |
| 2002/0009208 A1 * | 1/2002 | Alattar et al. ................. | 382/100 |
| 2009/0322787 A1 * | 12/2009 | Yang et al. .................... | 345/630 |
| 2010/0085452 A1 * | 4/2010 | Hirakawa et al. ............. | 348/273 |
| 2012/0230536 A1 * | 9/2012 | Fridrich et al. ............... | 382/100 |

FOREIGN PATENT DOCUMENTS

| | | |
|---|---|---|
| CN | 1707520 A | 12/2005 |
| CN | 1707520 A | 12/2005 |
| WO | 2008/045139 A2 | 4/2008 |

OTHER PUBLICATIONS

"Exposing Digital Forgeries in Color Filter Array Interpolated Images," Alin C. Popescu, et al, IEEE Transactions on Signal Processing, vol. 53, No. 10, Oct. 2005, pp. 3948-3959.*

(Continued)

*Primary Examiner* — Wenpeng Chen
(74) *Attorney, Agent, or Firm* — Fitzpatrick, Cella, Harper & Scinto

(57) ABSTRACT

A CFA pattern is extracted from captured image data for each first unit region. A first altered region is detected from disturbance of the periodicity of the CFA pattern, and the first altered region is an image region in which copying has been performed from image data different from the captured image data to the captured image data. The feature amount of the captured image data is extracted for each second unit region different in size from the first unit region. The feature amounts are compared for each second unit region to detect a second altered region, and the second altered region is an image region in which copying has been performed from the captured image data to the captured image data. Information concerning the first and second altered regions are output as alteration detection results in the captured image data.

13 Claims, 20 Drawing Sheets

(56) References Cited

OTHER PUBLICATIONS

"Accurate Detection of Demosaicing Regularity for Digital Image Forensics," Hong Cao et al, IEEE Transactions on Information Forensics and Security, vol. 4, No. 4, Dec. 2009, pp. 899-911.*

"Component Forensics," Ashwin Swaminathan et al, IEEE Signal Processing Magazine, Mar. 2009, pp. 38-48.*

Dirik et al., "Image Tamper Detection Based on Demosaicing Artifacts", ICIP 2009, pp. 1497-1500.

Popescu et al., "Exposing Digital Forgeries by Detecting Duplicated Image Regions", TR2004-515, 2004, Darmouth College, Computer Science.

Chinese Official Action dated Dec. 3, 2014, issued in corresponding Chinese Patent Application No. 201310057358.3, with an English translation.

* cited by examiner

FIG. 4A  FIG. 4B  FIG. 4C  FIG. 4D  FIG. 4E

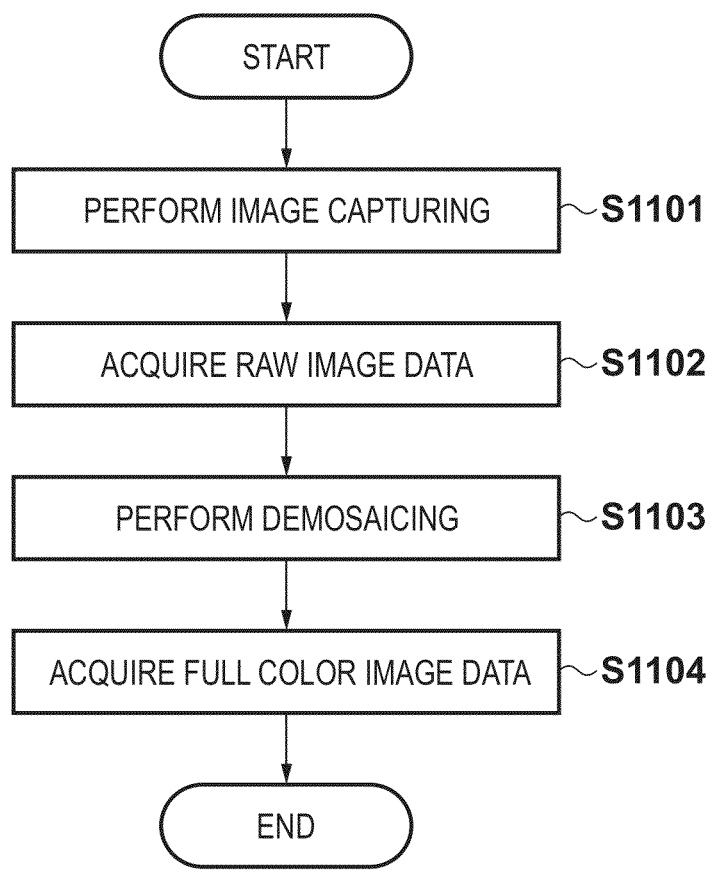

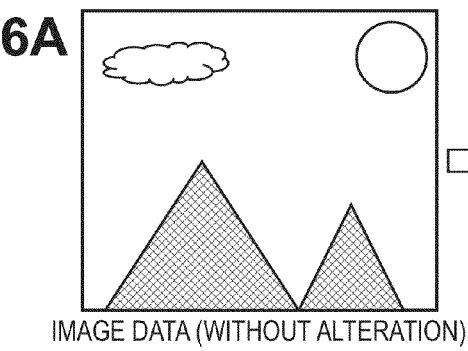
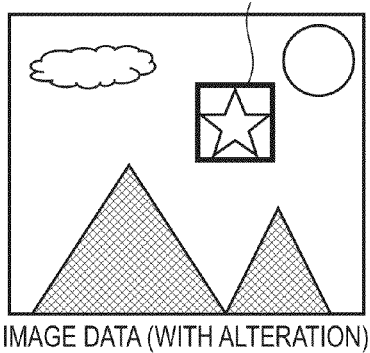
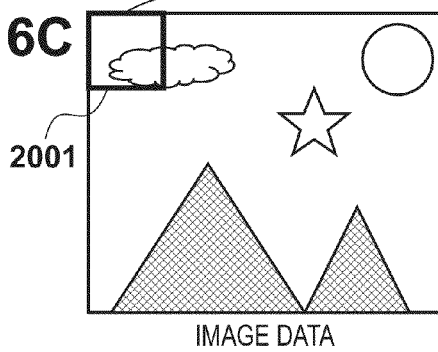
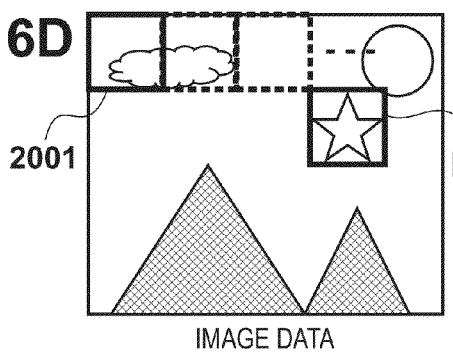

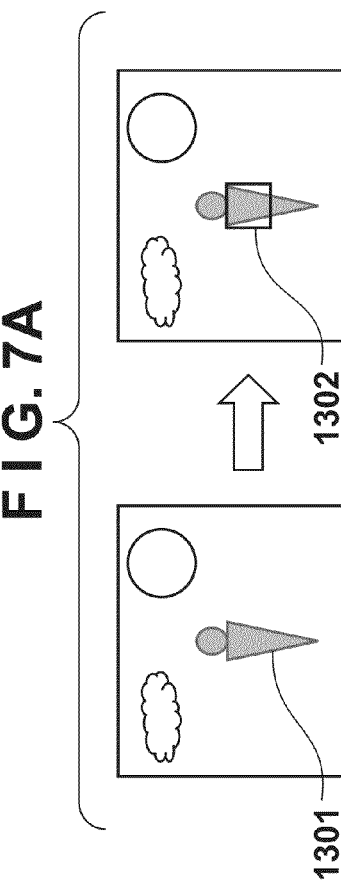
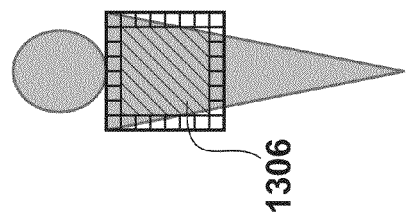
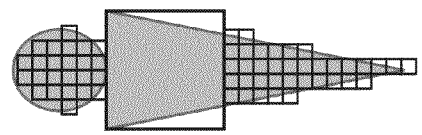
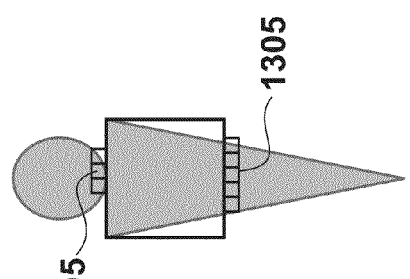
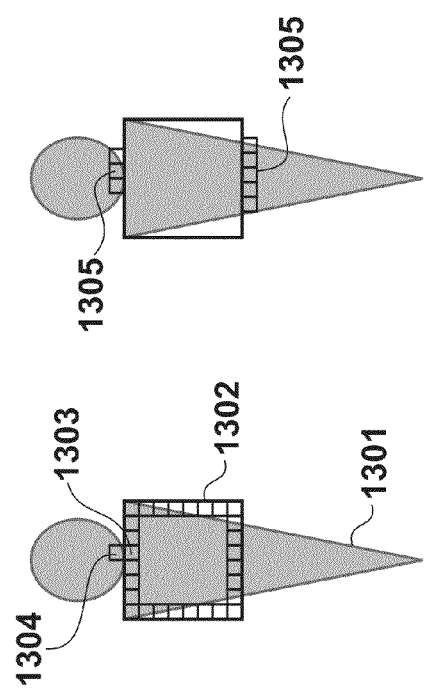

FIG. 10A
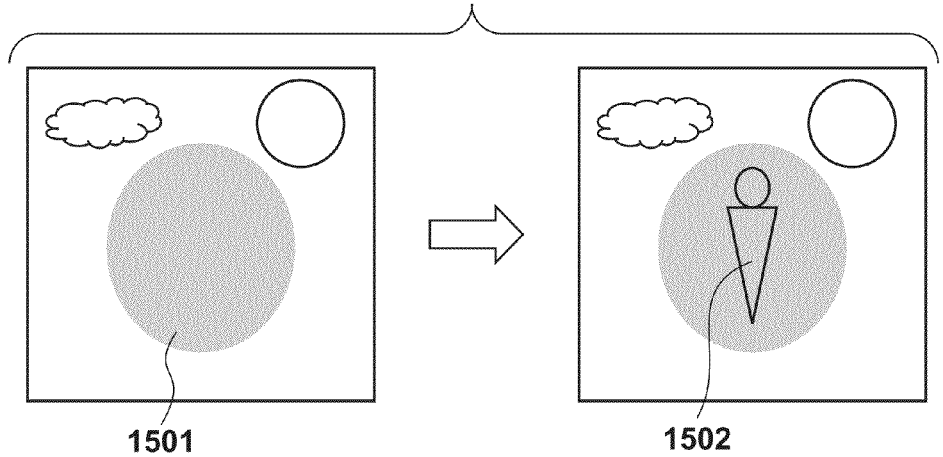
FIG. 10B
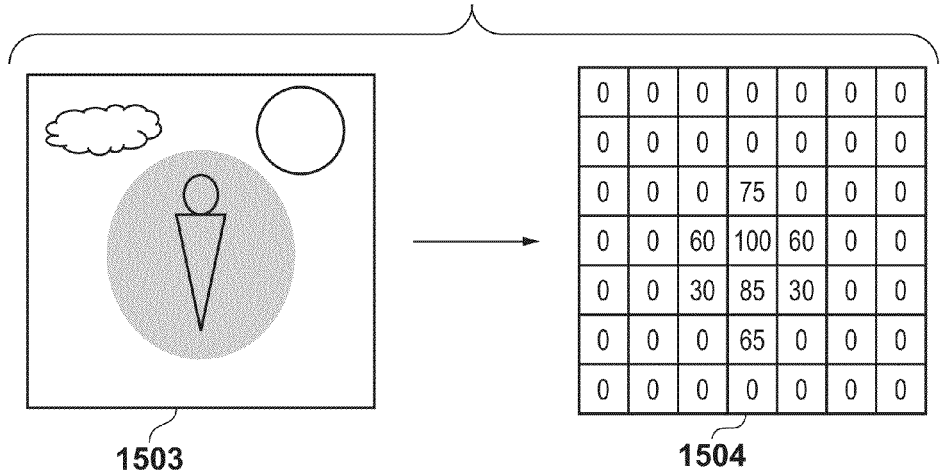
FIG. 10C
| 0 | 0 | 0 | 0 | 0 | 0 | 0 |
|---|---|---|---|---|---|---|
| 0 | 0 | 0 | 103 | 0 | 0 | 0 |
| 0 | 0 | 60 | 115 | 65 | 0 | 0 |
| 0 | 0 | 110 | 150 | 105 | 0 | 0 |
| 0 | 0 | 45 | 127 | 45 | 0 | 0 |
| 0 | 0 | 0 | 101 | 0 | 0 | 0 |
| 0 | 0 | 0 | 0 | 0 | 0 | 0 |
FIG. 10D
| 0 | 0 | 0 | 0 | 0 | 0 | 0 |
|---|---|---|---|---|---|---|
| 0 | 0 | 0 | 69 | 0 | 0 | 0 |
| 0 | 0 | 40 | 77 | 43 | 0 | 0 |
| 0 | 0 | 73 | 100 | 70 | 0 | 0 |
| 0 | 0 | 30 | 85 | 30 | 0 | 0 |
| 0 | 0 | 0 | 67 | 0 | 0 | 0 |
| 0 | 0 | 0 | 0 | 0 | 0 | 0 |

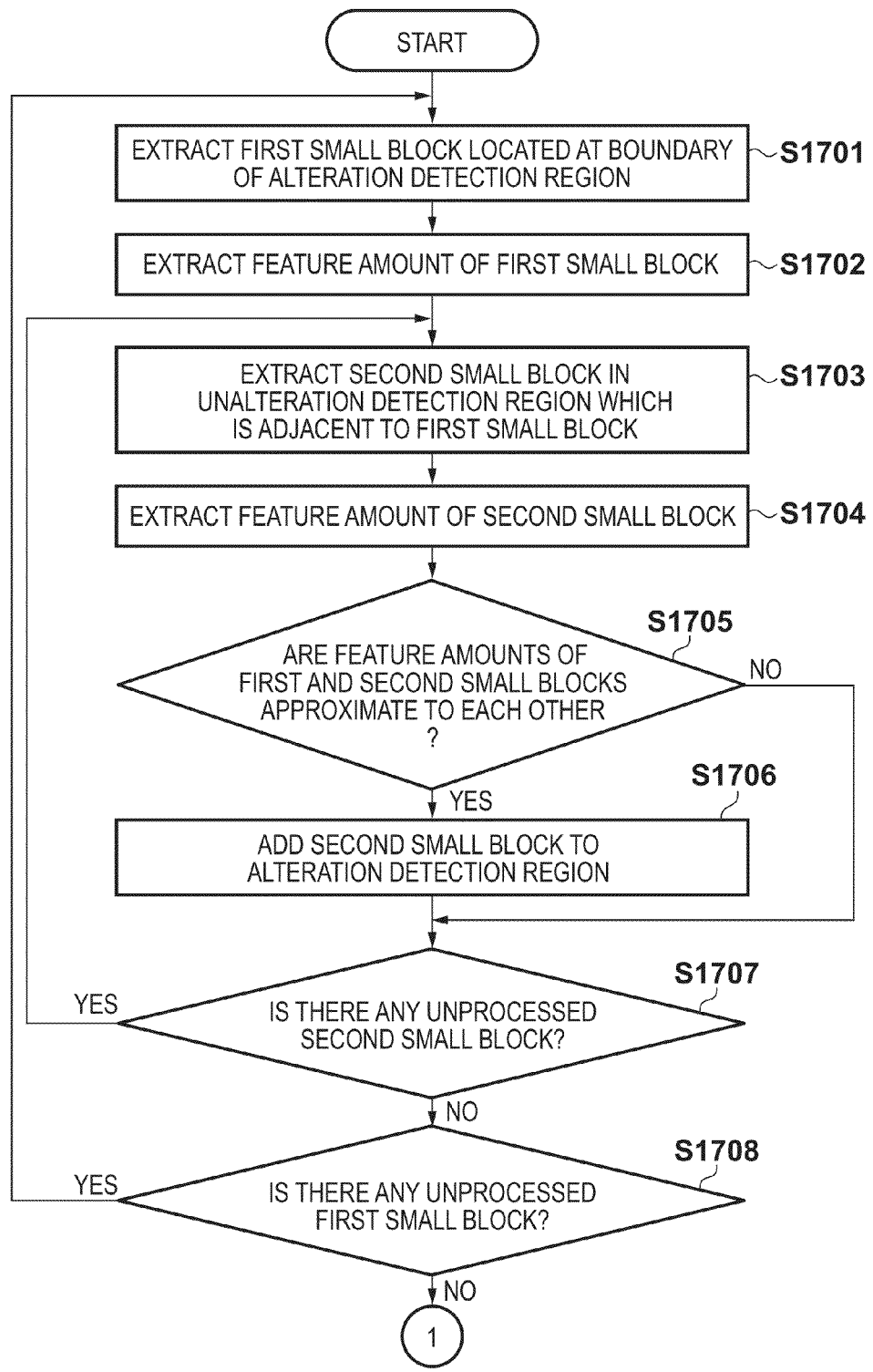

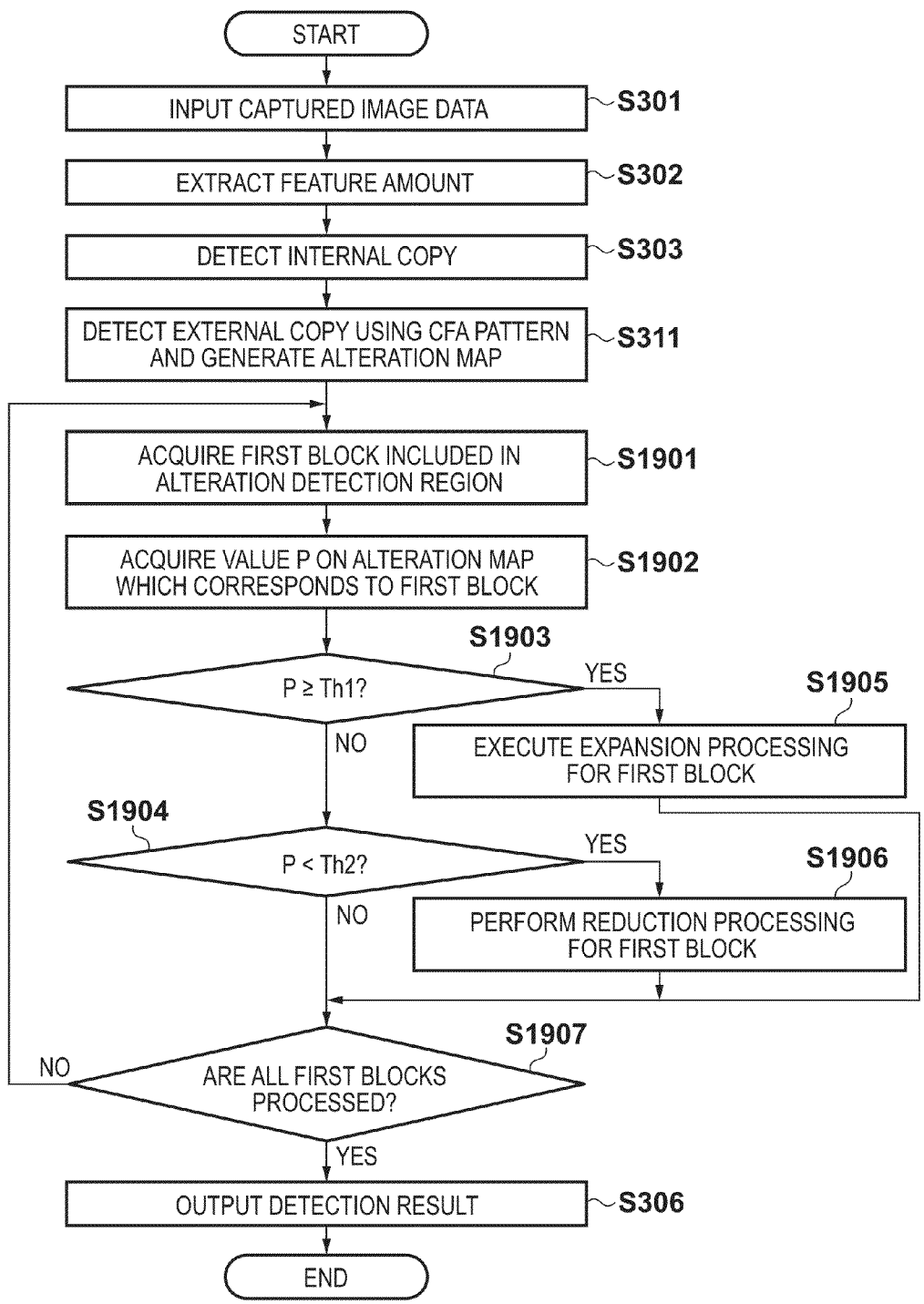

DETECTING ALTERATION OF AN IMAGE BASED ON PATTERN INFORMATION OF COLOR FILTER ARRAY

BACKGROUND OF THE INVENTION

1. Field of the Invention

The present invention relates to an image processing apparatus and an image processing method, and more particularly, to an image processing apparatus and image processing method which detect an alteration position in a captured image.

2. Description of the Related Art

There have been proposed the following techniques of detecting alterations in the images captured by compact digital cameras, single-lens reflex digital cameras, and the like. These techniques are designed to detect alteration by analyzing a pattern originally included in a captured image or comparing the feature amounts of the respective regions without embedding any additional information such as a digital watermark in the captured image. The techniques do not embed any additional information such as a digital watermark, and hence have a merit that they can detect alteration without degrading the image quality of a captured image or increasing the processing time due to embedding of additional information.

Ahmet Emir Dirik, Nasir Memon, "IMAGE TAMPER DETECTION BASED ON DEMOSAICING ARTIFACTS" ICIP 2009, pp. 1497-1500 (literature 1) is designed to estimate and analyze the color filter array (CFA) pattern of the image sensor of a camera such as a CMOS sensor or CCD (Charge-Coupled Device) from a captured image and use the pattern for the detection of alteration. A CFA is, for example, an RGB color filter arrangement, and indicates the RGB light reception pattern of each cell (a unit corresponding to a pixel of an image) of the image sensor. Many image sensors on the market are configured to make each cell acquire any one of the pieces of RGB color information for the sake of reducing costs. An image sensor uses a CFA typified by a Bayer arrangement to efficiently acquire color information, and acquires color information from incident light. A CFA has cells regularly and periodically arranged on an image sensor with, for example, a square arrangement of 2×2 cells being a unit.

Each pixel of an image generated by an image sensor (to be referred to as a "RAW image" hereinafter) has only one of the pieces of RGB color information. In order to generate a full color image with each pixel having all pieces of RGB color information, it is necessary to perform demosaicing processing for a RAW image. Demosaicing processing interpolates color information missing in each pixel from neighboring pixels by linear interpolation such as bilinear interpolation.

For example, copying a region of another image to an alteration target image (to be referred to as an "external copy" hereinafter) will mix the CFA pattern of the other image with that of the target image at an alteration position. As a result, the periodic CFA pattern is disrupted at the alteration position in the altered image. The technique in literature 1 is designed to detect alteration by estimating the CFA pattern of an image sensor from a full color image and detecting a position where the periodicity of the CFA pattern is disturbed.

In addition, some alteration is made in such a manner that a partial region of an alteration target image is copied to another region in the image (to be referred to as an "internal copy" hereinafter). According to the internal copy, the feature amount of a partial copy-source region matches that of a partial copy-destination region. The technique disclosed in Alin C. Popescu, Hany Farid, "Exposing Digital Forgeries by Detecting Duplicated Image Regions", TR2004-515, Dartmouth College, Computer Science (literature 2) detects alteration by extracting a feature amount for each partial region (for example, each 32×32 pixel region) in a captured image by principal component analysis and detecting a region pair (copy pair) whose feature amounts match each other within the same image.

With the technique in literature 1, it is possible to detect alteration by the external copy, but it is difficult to detect alteration by the internal copy, by which a CFA pattern is not easily disrupted. In contrast, the technique in literature 2 can detect alteration by the internal copy but cannot detect any alteration by the external copy, by which the feature amounts of the respective regions do not match each other. Therefore, in order to detect both alteration by the internal copy and alteration by the external copy, it is effective to use a combination of the technique using CFA patterns and the technique using the feature amounts of partial regions.

When a CFA pattern is used, a captured image is divided into relatively large blocks each constituted by, for example, 64×64 pixels, and alteration is detected by estimating a CFA pattern for each block. For this reason, although this technique detects alteration, it cannot detect the shape of the altered region and can detect only an approximate alteration position at most. In contrast to this, it is possible to also detect the shape of an altered region using the feature amounts of small partial regions.

However, the processing using the feature amount of a partial region of 32×32 pixels requires a processing time about 100 times longer than that when using the CFA pattern of a block constituted by 64×64 pixels. That is, alteration detection based on the combination of the technique using CFA patterns and the technique using the feature amounts of partial regions strongly depends on the processing time of the technique using the feature amounts of partial regions, and requires a long period of time.

SUMMARY OF THE INVENTION

In one aspect, an image processing apparatus comprising: a first detector configured to extract a pattern of a color filter array from captured image data for each first unit region, and to detect a first altered region from disturbance of periodicity of the pattern, wherein the first altered region is an image region in which copying has been performed from image data different from the captured image data to the captured image data; a second detector configured to extract a feature amount of the captured image data for each second unit region different in size from the first unit region, and to compare a feature amount for the each second unit region to detect a second altered region, wherein the second altered region is an image region in which copying has been performed from the captured image data to the captured image data; and an output section configured to output information concerning the first altered region and information concerning the second altered region as alteration detection results in the captured image data, wherein the second detector detects the second altered region based on the captured image data from which the first altered region is excluded.

In another aspect, an image processing method comprising the steps of: extracting a pattern of a color filter array from captured image data for each first unit region; detecting a first altered region from disturbance of periodicity of the pattern, wherein the first altered region is an image region in which copying has been performed from image data different from the captured image data to the captured image data; extracting a feature amount of the captured image data for each second unit region different in size from the first unit region; comparing a feature amount for the each second unit region to detect a second altered region, wherein the second altered region is an image region in which copying has been performed from the captured image data to the captured image data; and outputting information concerning the first altered region and information concerning the second altered region as alteration detection results in the captured image data, wherein, in the second detecting step, the second altered region is detected based on the captured image data from which the first altered region is excluded.

According to these aspects, it is possible to efficiently detect alteration in image data.

Further features of the present invention will become apparent from the following description of exemplary embodiments with reference to the attached drawings.

BRIEF DESCRIPTION OF THE DRAWINGS

FIGS. 4A to 4G are views showing an example of a CFA.

FIG. 5 is a flowchart for explaining the processing performed by a digital camera at the time of image capturing.

FIGS. 6A to 6D are views for explaining the detection of an external copy.

FIGS. 7A to 7E are views for explaining a method of modifying a region (alteration detection region) detected as an external copy region.

FIGS. 10A to 10D are views for explaining modification processing for an alteration detection region in the second embodiment.

FIGS. 17A and 17B are flowcharts for explaining expansion processing for an alteration detection region.

FIG. 19 is a flowchart for explaining the processing of switching between expansion processing and reduction processing for an alteration detection region in accordance with values on an alteration map.

DESCRIPTION OF THE EMBODIMENTS

An image processing apparatus and image processing method according to an embodiment of the present invention will be described in detail below with reference to the accompanying drawings.

First Embodiment

[Arrangement of Apparatus]

Figure 1:
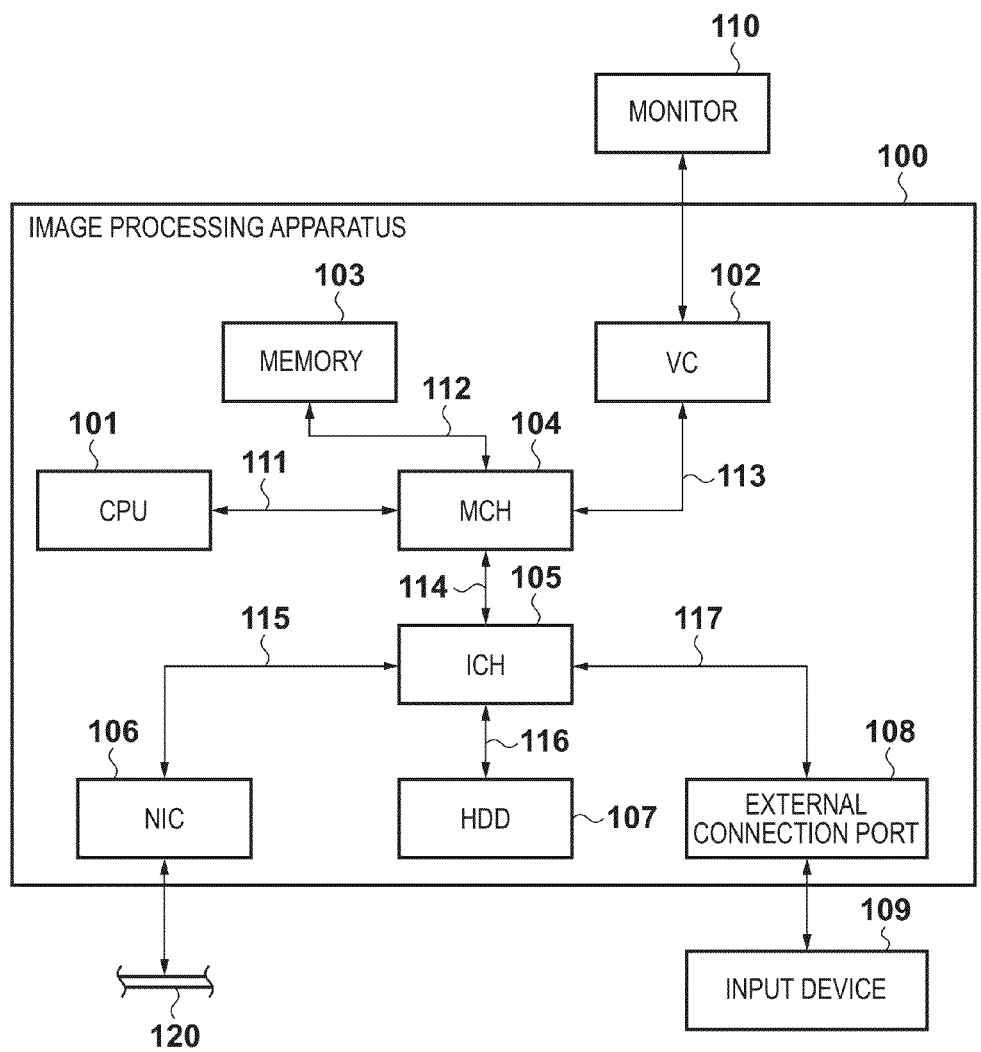
FIG. 1 is a block diagram showing the arrangement of an image processing apparatus according to an embodiment.

The block diagram of FIG. 1 shows the arrangement of an image processing apparatus 100 according to an embodiment.

A microprocessor (CPU) 101 controls all or some of the operations of the image processing apparatus 100 by executing programs stored in a memory 103 or a hard disk drive (HDD) 107 using the memory 103 as a work memory. Note that the memory 103 includes a random access memory (RAM) and a read-only memory (ROM). A video controller (VC) 102 performs control to display at least one window constituted by images, characters, and the like on a monitor 110 in accordance with an instruction from the CPU 101.

A memory controller hub (MCH) 104 is a so-called "North Bridge" which controls data transfer among the CPU 101, the VC 102, the memory 103, and an input/output controller hub (ICH) 105 through links 111 to 114. The ICH 105 is a so-called "South Bridge" which controls data transfer among a network interface card (NIC) 106, the HDD 107, and an external connection port 108 through links 115 to 117. Note that the links 111 to 117 are parallel buses such as a PCI (Peripheral Component Interconnect) and a PCI express or serial buses such as a Serial ATA and a USB (Universal Serial Bus).

The NIC 106 is a communication interface for connection to the wired or wireless network 120. The HDD 107 stores the OS (Operating System) and various kinds of programs executed by the CPU 101, and various kinds of data used by the CPU 101, and the like. The external connection port 108 is the port of a serial bus such as a USB or IEEE1394 for connecting an external device to the image processing apparatus 100. Connecting an input device 109 to the external connection port 108 allows the image processing apparatus 100 to acquire data from the input device 109. Note that the input device 109 is a device which inputs data to the image processing apparatus 100 through the external connection port 108, and includes, for example, a keyboard, a pointing device such as a mouse, an imaging apparatus such as a digital camera, and an image input device. In addition, preparing an HDMI® (High-Definition Multimedia Interface) port as the external connection port 108 can connect the monitor 110 to the external connection port 108.

Note that the image processing apparatus 100 can be implemented by supplying programs for implementing the processing to be described later to, for example, a personal computer.

[Functional Arrangement]

The functional arrangement of the image processing apparatus 100 will be described with reference to the block diagram of FIG. 2. The CPU 101 implements this functional arrangement by executing an image processing program in this embodiment.

An image input unit 201 inputs image data from the input device 109 through the external connection port 108, and stores the input image data in a predetermined area in the memory 103 or HDD 107. The input image data is image data representing the image captured by a digital camera. The data format of the input image data is JPEG (Joint Photographic Experts Group), TIFF (Tagged Image File Format), or RAW.

Detection of Internal Copy

A feature amount extraction unit 202 extracts a feature amount for each first unit region of the image represented by input image data. The first unit region is a square region of X×X pixels. If, for example, X=4, a unit region is constituted by 4×4 pixels, whereas if X=8, a unit region is constituted by 8×8 pixels. A feature amount is extracted using, for example, principal component analysis. Assume that the image represented by input image data includes 512×512 pixels, and the first unit region is constituted by 4×4 pixels. In this case, the feature amount extraction unit 202 extracts feature amounts corresponding to a total of 128 blocks.

Although an image may be divided at the time of extraction of feature amounts such that the first unit regions do not overlap each other, the image may be divided such that each first unit region is horizontally or vertically moved pixel by pixel. Assume that an image is constituted by 512×512 pixels, and the first unit region is constituted by 4×4 pixels. In this case, if each first unit region is horizontally moved pixel by pixel a total of 512−4+1 times and is also vertically moved pixel by pixel a total of 512−4+1 times, the feature amount extraction unit 202 extracts feature amounts corresponding to a total of 509×509 blocks. At this time, as the first unit region increases, the processing time required for feature amount extraction increases. As a consequence, the time required for the extraction of feature amounts corresponding to all the blocks greatly increases. Therefore, the smaller the first unit region, the better. For example, the first unit region is preferably constituted by 4×4 pixels.

Figure 3:
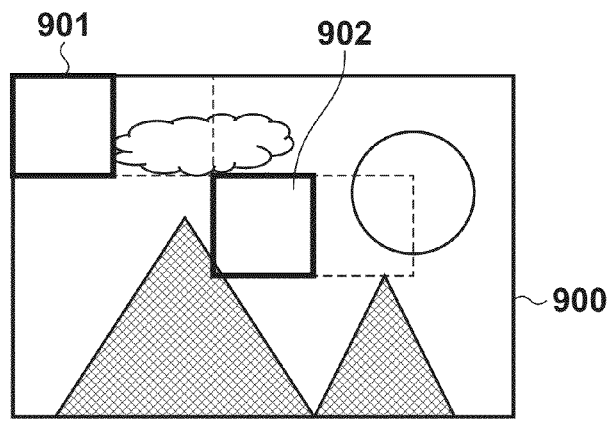
FIG. 3 is a view for explaining the detection of a copy pair.

An internal copy detection unit 203 as the first detection unit detects an internally copied region pair (copy pair) included in input image data using the feature amounts extracted by the feature amount extraction unit 202. The detection of a copy pair will be described with reference to FIG. 3. That is, the internal copy detection unit 203 compares the feature amount of a target block 901 corresponding to the first unit region of input image data 900 with that of another block (comparative block) 902. If the feature amounts of the two regions match each other (or the difference between them is equal to or less than a predetermined threshold), the internal copy detection unit 203 determines that the target block 901 and the comparative block 902 are a copy pair. The internal copy detection unit 203 stores, as detection results, the upper left pixel coordinates of each block of the copy pair and the size of the first unit region in a predetermined area in the memory 103 or the like.

Note that a copy-source block group, a copy-destination block group, and a combination of a copy-source region and a copy-destination region will be sometimes referred to as a "copy-source region", a "copy-destination region", and an "internal copy region (first altered region)", respectively.

Detection of External Copy

Figures 4A, 4B, 4C, 4D, 4E:
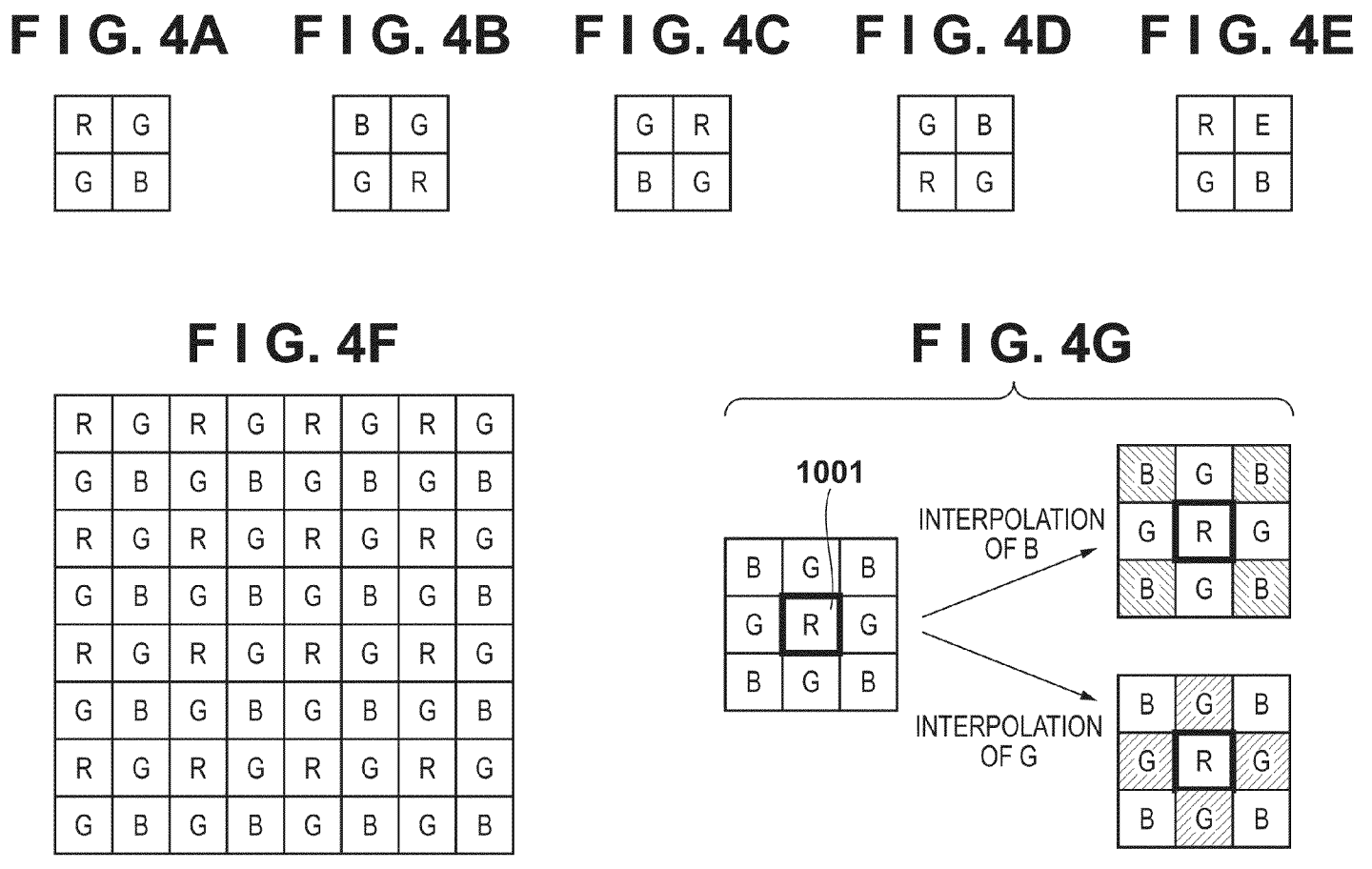

FIGS. 4A to 4G show an example of a CFA. FIGS. 4A to 4D show a Bayer arrangement. FIG. 4E shows a CFA (Color Filter Array) in which one of two green elements G is replaced with an emerald green element E. The elements of the CFA are regularly arranged on an image sensor, as shown in, for example, FIG. 4F.

The processing performed by the digital camera at the time of image capturing will be described with reference to the flowchart of FIG. 5. Image capturing will photoelectrically convert an optical image of an object into a digital signal (S1101). The digital signal is acquired as RAW image data (S1102). The color information of the RAW image data depends on the CFA pattern of the image sensor. With the CFA shown in FIG. 4A, each pixel of RAW image data has color information like that shown in FIG. 4F.

As described above, each pixel of RAW image data has only one piece of color information, and hence it is necessary to make each pixel have RGB color information (conversion to full color information). In order to provide RGB color information for each pixel, the apparatus interpolates missing color components from neighboring pixels (S1103). For example, since a target pixel 1001 shown in FIG. 4G has only an R component, the apparatus interpolates a missing B component from four neighboring pixels B and interpolates a missing G component from four neighboring pixels G. Performing developing processing including this interpolation processing will acquire full color image data from the RAW image data (S1104). Such color component interpolation processing will be referred to as "demosaicing".

An external copy detection unit 204 as the second detection unit detects alteration by estimating the CFA pattern of the digital camera used for image capturing from the input image data. Note that if the input image data is RAW image data, the pattern of color information of the respective pixels is a CFA pattern as it is. If the input image data is full color image data, since each pixel has all color components, a CFA pattern needs to be estimated.

CFA pattern estimation is performed for each second unit region. The second unit region is a square region of Y×Y pixels, and is a region having a size satisfying "size of first unit region"<"size of second unit region". If, for example, the first unit region is constituted by 4×4 pixels, the second unit region can be constituted by 64×64 pixels with Y=64. If the second unit region is small, a CFA pattern may be erroneously estimated. Therefore, the larger the second unit region, the better.

The apparatus estimates, for each second unit region, to which one of the four Bayer arrangements shown in FIGS. 4A to 4D the CFA pattern of full color image data corresponds. When performing this estimation, the apparatus performs, for each second unit region, simple linear interpolation (to be referred to as "re-demosaicing" hereinafter) such as bilinear interpolation for a full color image in accordance with the four Bayer arrangements. The apparatus then calculates the minimum least square errors of G components among the four image data after re-demosaicing and the original full color image data, and sets, as the CFA pattern of the second unit region of interest, a Bayer arrangement used for re-demosaicing which corresponds to image data exhibiting the smallest minimum least error.

The detection of an external copy will be described with reference to FIGS. 6A to 6D. For example, the apparatus generates four sets of image data by re-demosaicing a target region (second unit region) 2001 in the image data shown in FIG. 6C using the four Bayer arrangements shown in FIGS. 4A to 4D. If image data corresponding to the smallest least square error of G components among the image data and the target region 2001 matches the image data re-demosaiced using the Bayer arrangement shown in FIG. 4A, the apparatus estimates that the CFA pattern of the target region 2001 is that shown in FIG. 4A.

As shown in FIG. 6D, the apparatus performs CFA pattern estimation using re-demosaicing for all the second unit regions to estimate CFA patterns 2003 of all the second unit regions. Regarding the largest majority (the CFA pattern in FIG. 4A in the case of FIG. 6D) of the estimated CFA patterns as the original CFA pattern of the overall full color image data, the apparatus detects, as an alteration position, a second unit region 2005 where a CFA pattern 2004 different from the original CFA pattern is estimated.

That is, if alteration by external copy is made in input image data having a CFA pattern like that shown in FIG. 6A, the CFA pattern of another image data mixes with it at the alteration position. As shown in FIG. 6B, the apparatus detects the disturbance of the regularity of the CFA pattern in a block 1202 corresponding to an alteration position 1201. The external copy detection unit 204 detects the block 1202 in which the regularity of the CFA pattern is disturbed as an altered region. For the sake of simplicity, FIGS. 6A to 6D show as if one CFA pattern were arranged for one second unit region. In practice, however, a CFA pattern of 2×2 pixels is arranged in the second unit region so as to lay tiles.

As another method of detecting the disturbance of the regularity of a pattern, there is available a method using the minimum least errors of G components among the respective blocks of the original full color image data and the results obtained by re-demosaicing the respective blocks in accordance with the CFA pattern estimated from the overall full color image. That is, a block exhibiting the minimum square error equal to or more than a predetermined threshold is regarded as a block having a CFA pattern deviating from the estimated CFA pattern. The apparatus determines this block as a block in which the regularity of the pattern is disturbed. The external copy detection unit 204 stores, as detection results, the upper left pixel coordinates and size of the block in a predetermined area in the memory 103 or the like.

Note that a block group copied from another image is sometimes referred to as an "external copy region (second altered region)".

Modification of Alteration Detection Region

A method of modifying a region (to be referred to as an "alteration detection region" hereinafter) detected as an external copy region will be described with reference to FIGS. 7A to 7E. The image shown in FIG. 7A includes an altered region 1301. The external copy detection unit 204 detects an altered region by estimating a CFA pattern for each block (second unit region) having a relatively large size (for example, 64×64 pixels). For this reason, the external copy detection unit 204 detects, as an altered region, a block 1302 including many altered regions. On the other hand, the circular region of the top portion of the altered region 1301 and the inverted triangle of the lower portion are not sufficiently larger in area than the block, and hence these regions are not detected as altered regions.

In an altered region, an object having a meaning as a set of pixels such as a copy of a human image or a copy of a product image is generally formed. Therefore, there is a tendency that in an altered region, while adjacent pixels are approximate in color information, edge, and the like, the color information and edges of adjacent pixels located at the boundary between the altered region and an unaltered region decrease in continuity. For example, each pixel in the altered region 1301 in FIG. 7A has the same color information, but the portion outside the altered region 1301 is white, and the continuity of the color information does not straddle the boundary. With the use of such characteristics, an alteration detection region is expanded by adding a region having a feature amount approximate to that of the alteration detection region to the alteration detection region.

That is, a region modification unit 205 expands an alteration detection region in accordance with the shape of an altered region using the altered region detection result obtained by the external copy detection unit 204 and the feature amounts extracted by the feature amount extraction unit 202. The following is a case in which the feature amount extraction unit 202 extracts a feature amount for each small block of 8×8 pixels, and the external copy detection unit 204 detects an altered region by using a block of 64×64 pixels.

The region modification unit 205 compares the feature amount of a small block 1303 of 8×8 pixels located at the boundary of the block 1302 with the feature amount of a small block 1304 of 8×8 pixels which straddles the boundary and is adjacent to the small block 1303 (FIG. 7B). If the difference between these feature amounts is equal to or less than a predetermined threshold, the region modification unit 205 adds the small block 1304 to the alteration detection region. Upon comparison with all the small blocks located at the boundary of the block 1302, the region modification unit 205 adds a small block group 1305 adjacent to the boundary of the block 1302 to the alteration detection region, as shown in FIG. 7C.

The region modification unit 205 repeatedly compares the feature amount of each small block of the small block group 1305 added to the alteration detection region with the feature amount of a small block adjacent to each small block. If the difference between these feature amounts is equal to or less than the threshold, the region modification unit 205 adds the corresponding small block to the alteration detection region. The region modification unit 205 repeats this processing to expand the alteration detection region until there is no small block to be added to the alteration detection region (FIG. 7D). This makes it possible to extract an alteration detection region more closely matching the shape of the altered region 1301, as shown in FIG. 7D. The region modification unit 205 stores, as detection results, the upper left pixel coordinates and size of each block constituting the alteration detection region in a predetermined area in the memory 103 or the like.

An output unit 206 outputs the detection results obtained by the internal copy detection unit 203 and the detection results obtained by detection by the external copy detection unit 204 and modification by the region modification unit 205. The monitor 110 visualizes and displays the detection results as the alteration detection results on the input image data. This visualization is implemented by, for example, superimposing, on the image represented by the input image data, rectangular frames indicating the blocks constituting the alteration detection region, the outline of the region, rectangular frames indicating the internal copy-source block and copy-destination block, copy-source and copy-destination outlines, and the like.

[Alteration Detection Processing]

Alteration detection processing will be described with reference to the flowchart of FIG. 8.

The image input unit 201 inputs the image data of a captured image (S301). The feature amount extraction unit 202 extracts a feature amount for each block from the input image data (S302). The internal copy detection unit 203 detects a copy pair included in the image represented by the input image data using the extracted feature amounts (S303).

The external copy detection unit 204 detects an altered region included in the image represented by the input image data using a CFA pattern (S304). When the external copy detection unit 204 detects an altered region, the region modification unit 205 modifies (expands in this case) the alteration detection region using the extracted feature amounts (S305) to obtain an alteration detection region more closely matching the shape of the altered region.

The output unit 206 then outputs the detection results obtained by the internal copy detection unit 203 and the detection results obtained by detection by the external copy detection unit 204 and modification by the region modification unit 205 (S306).

Figure 17B:
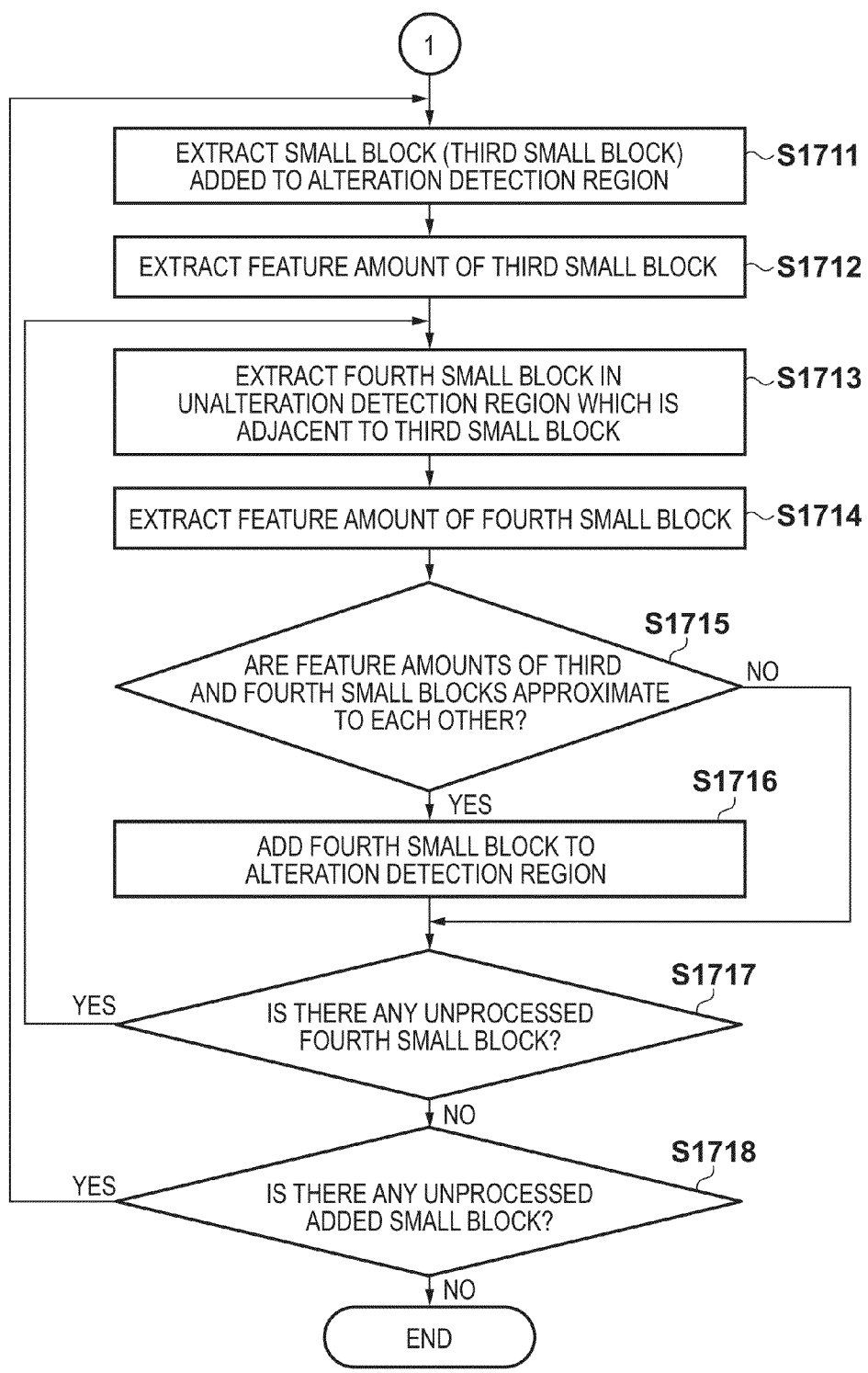

The processing of expanding an alteration detection region in modifying an alteration detection region (S305 in FIG. 8) will be described with reference to the flowcharts of FIGS. 17A and 17B.

The region modification unit 205 extracts the first unit region (to be referred to as a "first small block" hereinafter) located at the boundary of the alteration detection region detected in step S304 (S1701), and extracts the feature amount of the first small block (S1702). The region modification unit 205 further extracts the first unit region (to be referred to as a "second small block" hereinafter) of an unalteration detection region adjacent to the extracted first small block (S1703), and extracts the feature amount of the second small block (S1704).

The region modification unit 205 determines whether the feature amounts extracted from the first and second small blocks are approximate to each other (S1705). If the difference between the feature amount of the first small block and that of the second small block is equal to or less than a predetermined threshold, the region modification unit 205 determines that the feature amounts are approximate to each other. If the difference exceeds the threshold, the region modification unit 205 determines that the feature amounts are not approximate to each other. Upon determining that the feature amounts are approximate to each other, the region modification unit 205 adds the second small block to the alteration detection region (S1706). Upon determining that the feature amounts are not approximate to each other, the region modification unit 205 adds no block to the alteration detection region.

The region modification unit 205 then determines whether it has performed addition processing based on the above approximation determination and determination results for all the second small blocks of the unalteration detection region adjacent to the first small blocks (S1707). If there is any unprocessed second small block, the process returns to step S1703. If the region modification unit 205 determines that there is no unprocessed second small block, the process advances to step S1708. The region modification unit 205 then determines whether it has performed the processing in steps S1701 to S1707 for all the first small blocks located at the boundary of the alteration detection region before expansion (in other words, the region detected in step S304) (S1708). If there is any unprocessed first small block, the process returns to step S1701.

Upon completion of the processing in steps S1701 to S1708, the region modification unit 205 extracts the small block (to be referred to as a "third small block") added to the alteration detection region (S1711), and extracts the feature amount of the third small block (S1712). The region modification unit 205 extracts the first unit region (to be referred to as a "fourth small block" hereinafter) of the unalteration detection region adjacent to the extracted third small block (S1713), and extracts the feature amount of the fourth small block (S1714).

The region modification unit 205 performs approximation determination similar to that in step S1705 for the feature amounts of the third and fourth small blocks (S1715). Upon determining that the feature amounts are approximate to each other, the region modification unit 205 adds the fourth small block to the alteration detection region (S1716). Upon determining that the feature amounts are not approximate to each other, the region modification unit 205 adds no block to the alteration detection region.

The region modification unit 205 determines whether it has performed addition processing based on the above approximation determination and determination results for all the fourth small blocks of the unalteration detection region adjacent to the third small blocks (S1717). If there is any unprocessed fourth small block, the process returns to step S1713. If the region modification unit 205 determines that there is no unprocessed fourth small block, the process advances to step S1718. The region modification unit 205 then determines whether it has performed the processing from step S1711 to step S1717 for all the small blocks added to the alteration detection region (that is, the added second and fourth small blocks) (S1718). If there is any unprocessed first small block, the process returns to step S1711.

In this manner, the region modification unit 205 repeats the processing from step S1711 to step S1718 until there is no small block to be newly added to the alteration detection region.

[Reduction of Alteration Detection Region]

The above description has exemplified the case in which an alteration detection region is expanded. A case in which an alteration detection region is reduced will be described below with reference to FIGS. 9A to 9D.

Figure 9A:
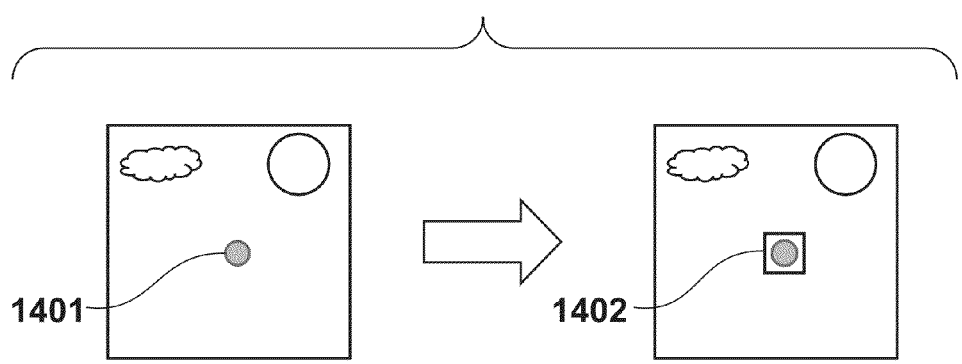
FIGS. 9A to 9D are views for explaining an example of reducing an alteration detection region.

As shown in FIG. 9A, an alteration detection region 1402 sometimes covers an entire altered region 1401 depending on the threshold of the external copy detection unit 204 and input image data. In this case, in order to make the alteration detection region 1402 more closely match the shape of the altered region 1401, it is necessary to reduce the alteration detection region 1402.

The region modification unit 205 has a function of reducing the alteration detection region 1402 so as to make it more closely match the shape of the altered region 1401. Like expansion processing, this reduction is implemented using the characteristics that the feature amounts of adjacent blocks (for example, blocks of 8×8 pixels) in the altered region 1401 are approximate to each other, and the feature amounts of adjacent blocks outside the altered region 1401 are also approximate to each other. In addition, the approximation of the feature amounts between adjacent blocks straddling the boundary between the altered region 1401 and the unaltered region deteriorates.

Figure 9B:
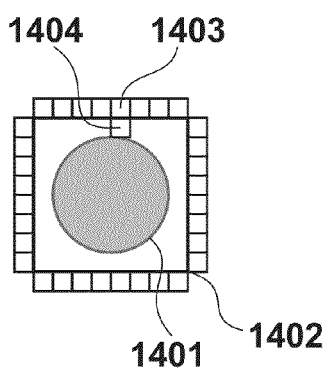
Figure 9C:
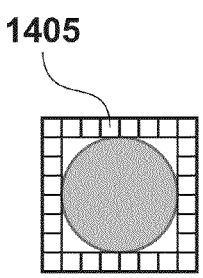

When performing reduction in an opposite manner to that in expansion processing, the region modification unit 205 compares the feature amount of a small block 1403 located outside the boundary of the alteration detection region 1402 with the feature amount of a small block 1404 (a small block in the alteration detection region 1402) which is adjacent to the small block 1403 while straddling the boundary (FIG. 9B). If the difference between these feature amounts is equal to or less than a predetermined threshold, the region modification unit 205 excludes the small block 1404 from the alteration detection region 1402. Performing this exclusion processing for all the small blocks located at the boundary of the alteration detection region 1402 will reduce the alteration detection region 1402 by excluding a small block group 1405 from the alteration detection region 1402, as shown in FIG. 9C.

Figure 9D:
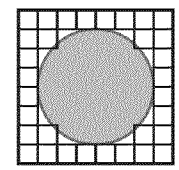

In addition, the region modification unit 205 repeats the above processing based on the comparison between the feature amounts of small blocks adjacent to the small block group 1405 (small blocks further located inside the alteration detection region 1402) until there is no small block to be excluded. As shown in FIG. 9D, it is possible to make the alteration detection region 1402 more closely match the shape of the altered region 1401 by reducing the alteration detection region.

Figure 8:
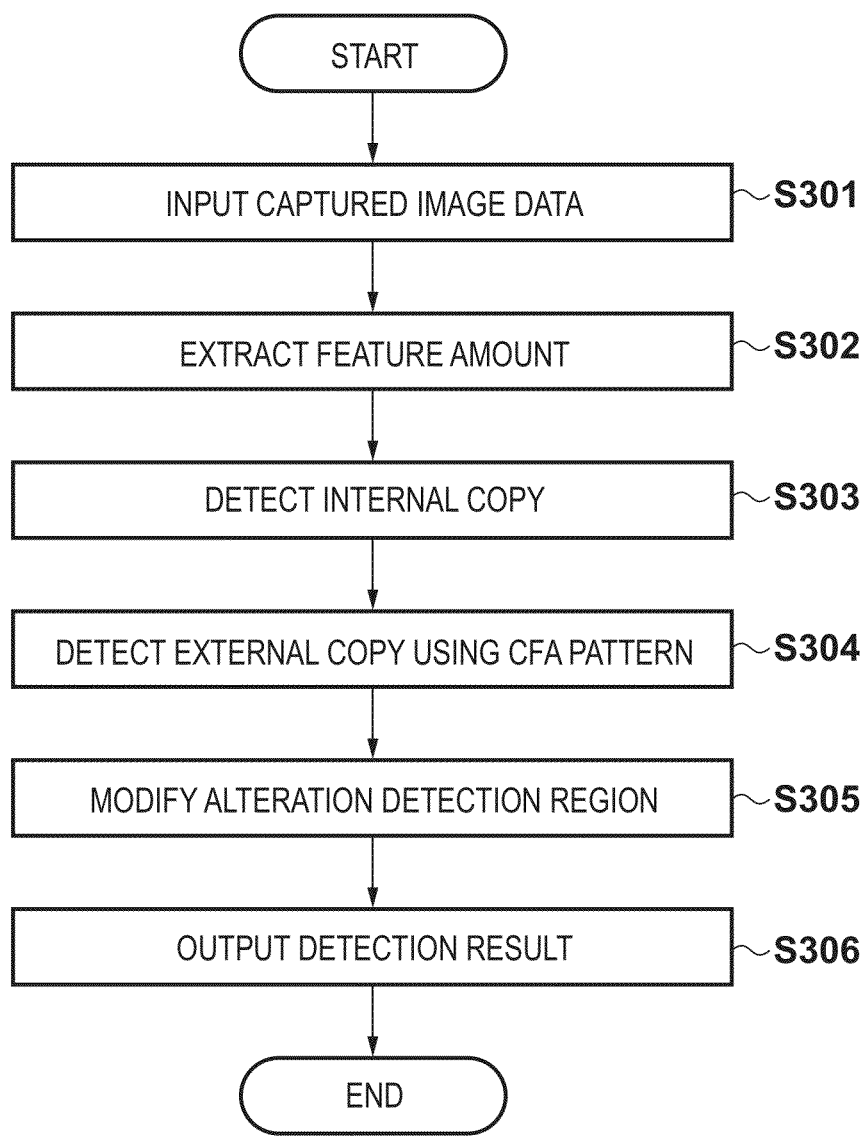
FIG. 8 is a flowchart for explaining alteration detection processing.

Alteration detection processing of reducing an alteration detection region is the same as that shown in FIG. 8 except that the region modification unit 205 reduces (modifies) the alteration detection region using extracted feature amounts (S305) and makes the shape of the altered region 1401 more closely match the alteration detection region.

Figure 18A:
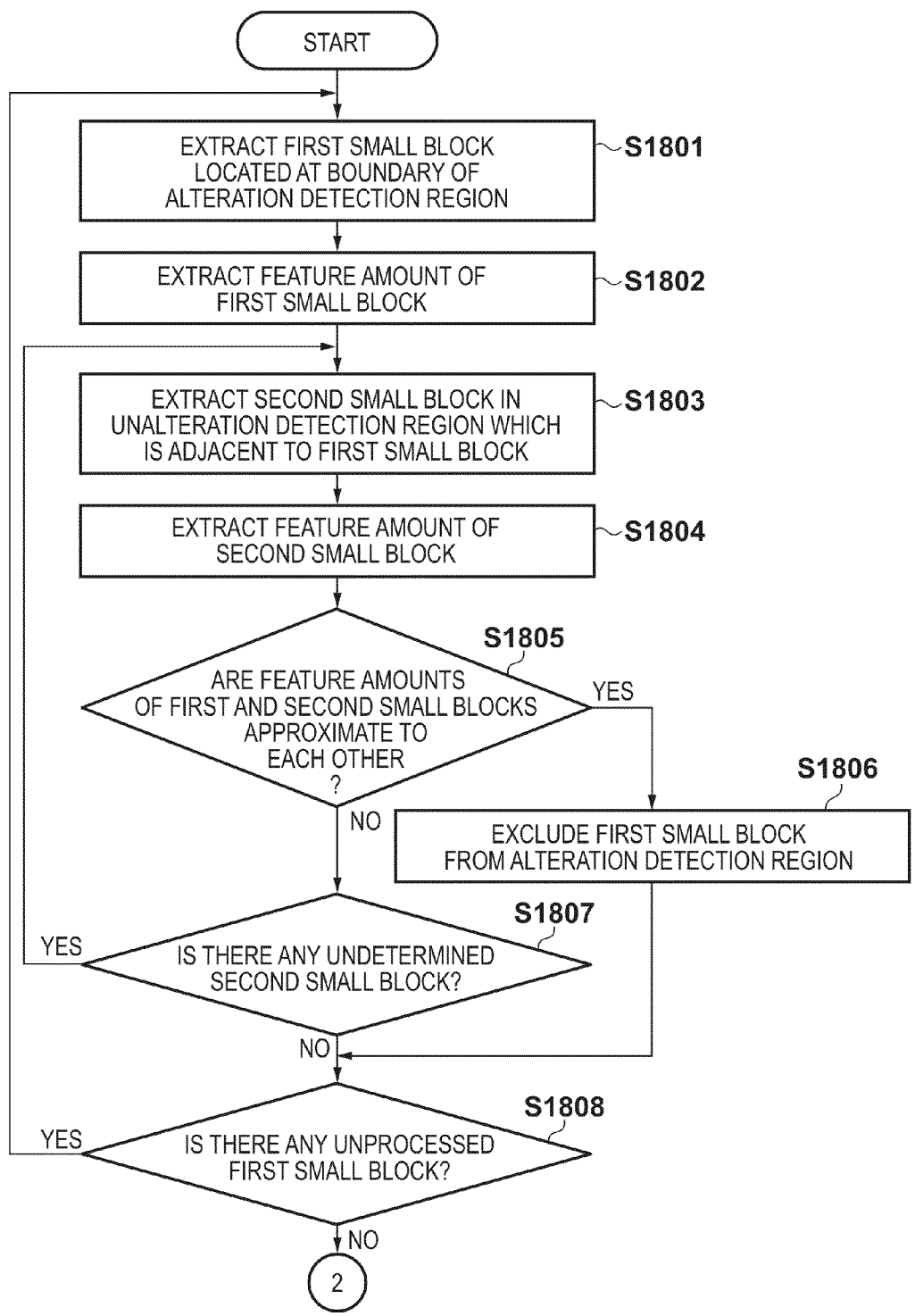
FIGS. 18A and 18B are flowcharts for explaining reduction processing for an alteration detection region.
Figure 18B:
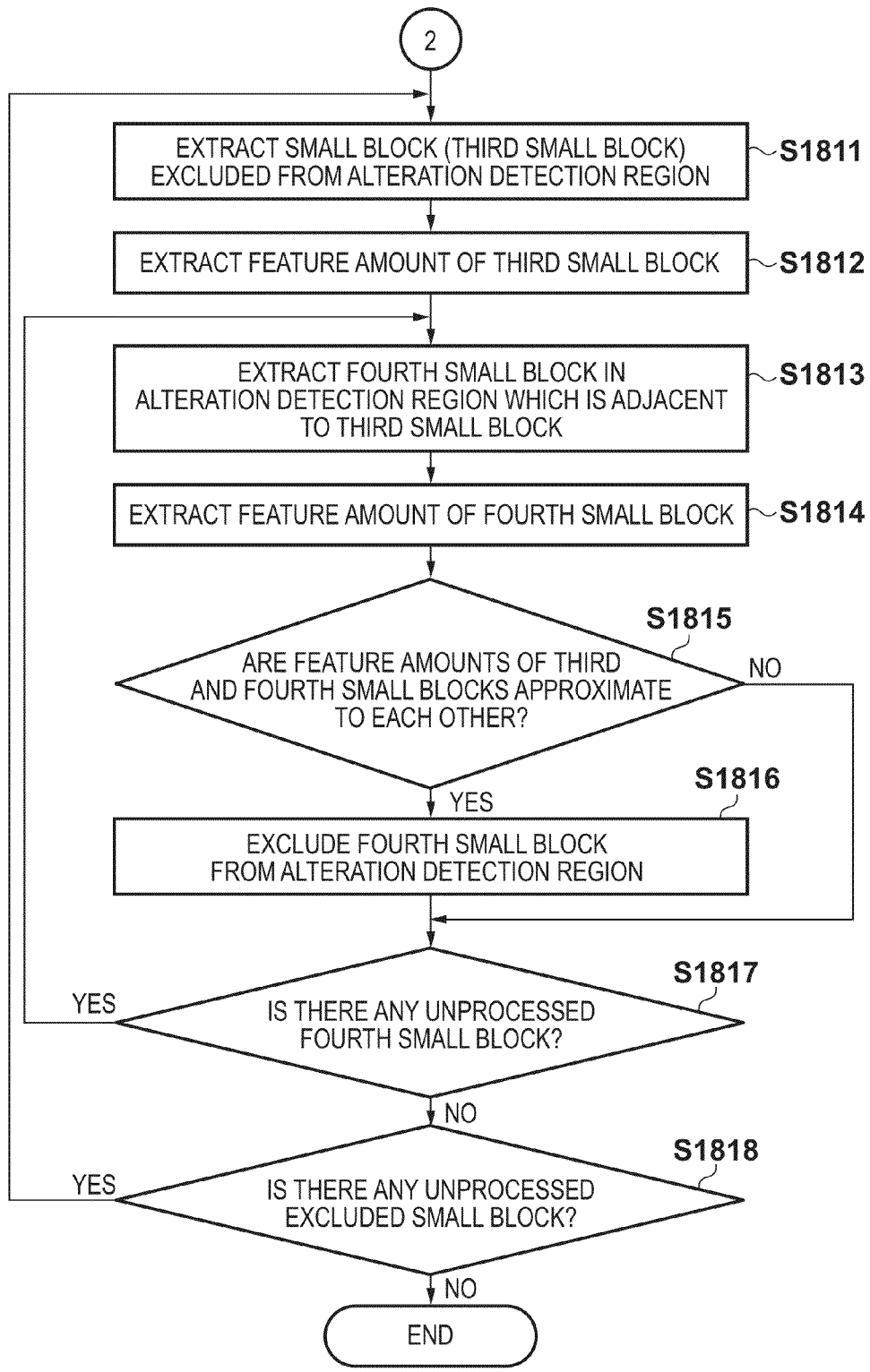

The processing of reducing an alteration detection region in modifying the alteration detection region (step S305 in FIG. 8) will be described with reference to the flowcharts of FIGS. 18A and 18B.

The region modification unit 205 extracts the first unit region (to be referred to as the "first small block") located at the boundary of the alteration detection region detected in step S304 (S1801), and extracts the feature amount of the first small block (S1802). The region modification unit 205 extracts the first unit region (to be referred to as the "second small block") of the unalteration detection region which is adjacent to the extracted first small block (S1803), and extracts the feature amount of the second small block (S1804).

The region modification unit 205 then performs approximation determination similar to that in step S1705 for the feature amounts of the first and second small blocks (S1805), and excludes the first small block from the alteration detection region upon determining that the feature amounts are approximate to each other (S1806). The process advances to step S1808. If the region modification unit 205 determines that the feature amounts are not approximate to each other, the process advances to step S1807 without excluding any block from the alteration detection region.

Upon determining in step S1805 that the feature amounts of the first and second small blocks are not approximate to each other, the region modification unit 205 determines whether it has performed the above approximation determination for all the second small blocks of the unalteration detection region which are adjacent to the first small blocks (S1807). If there is any undetermined second small block, the process returns to step S1803.

Upon excluding the first small block in step S1806 or determining in approximation determination in step S1807 that there is no undetermined second small block, the region modification unit 205 determines whether it has performed the processing from step S1801 to step S1807 for all the first small blocks located at the boundary of the alteration detection region before reduction (in other words, detected in step S304) (S1808). If there is any unprocessed first small block, the process returns to step S1801.

Upon completion of the processing from step S1801 to step S1808, the region modification unit 205 extracts the small block (to be referred to as the "third small block") excluded from the alteration detection region (S1811), and extracts the feature amount of the third small block (S1812). The region modification unit 205 extracts the first unit region (to be referred to as the "fourth small block") of the alteration detection region which is adjacent to the extracted third small block (S1813), and extracts the feature amount of the fourth small block (S1814).

The region modification unit 205 then performs approximation determination similar to that in step S1705 for the feature amounts of the third and fourth small blocks (S1815). Upon determining that the feature amounts are approximate to each other, the region modification unit 205 excludes the fourth small block from the alteration detection region (S1816). Upon determining that the feature amounts are not approximate to each other, the region modification unit 205 excludes no block from the alteration detection region.

The region modification unit 205 then determines whether it has performed exclusion processing based on the above approximation determination and determination results for all the fourth small blocks of the alteration detection area which are adjacent to the third small blocks (S1817). If there is any unprocessed fourth small block, the process returns to step S1813. If the region modification unit 205 determines that there is no unprocessed small block, the process advances to step S1818. The region modification unit 205 then determines whether it has performed the processing from step S1811 to step S1817 for all the small blocks (that is, the excluded first and fourth small blocks) excluded from the alteration detection region (S1818). If there is any unprocessed small block, the process returns to step S1811.

In this manner, the region modification unit 205 repeats the processing from step S1811 to step S1818 until there is no small block to be excluded from the alteration detection region.

[Output Unit]

The output unit 206 need not output processing results altogether, and may output processing results in the order in which the processing results are obtained (in general, in the order of the detection result on external copy, the modification result on the alteration detection region based on external copy, and the detection result on internal copy). When visualizing and displaying processing results, the monitor 110 displays, for example, a detection region of alteration by external copy, modifies the alteration detection region, and displays a detection region of alteration by internal copy.

Note that if no external copy is detected, the output unit 206 outputs information indicating that no alteration by external copy has been detected. If no internal copy is detected, the output unit 206 outputs information indicating that no alteration by internal copy has been detected.

In this manner, the apparatus can output an external copy detection result in a short period of time, and can output an internal copy detection result with high accuracy, thereby efficiently and accurately detecting alteration in captured image data. In addition, performing modification processing for a detection region of alteration by external copy can improve the accuracy of an external copy detection result.

Second Embodiment

An image processing apparatus and image processing method according to the second embodiment of the present invention will be described below. The same reference numerals as those in the first embodiment denote the same components of the second embodiment, and a detailed description of them will be omitted.

Modification processing for an alteration detection region in the second embodiment will be described with reference to FIGS. 10A to 10D. If an altered region 1502 and an unaltered region 1501 shown in FIG. 10A are similar in color information, no small block of the unaltered region 1501 is added to the alteration detection region in the second embodiment. In this case, this embodiment is configured to limit a target region for modification processing and suppress excessive expansion of the region using a map (to be referred to as an "alteration map" hereinafter) which indicates a value corresponding to the possibility of alteration for each region of image data which can be acquired at the time of alteration detection using a CFA pattern.

An external copy detection unit 204 further generates an alteration map by detecting an external copy in the same manner as in the first embodiment. When, for example, the apparatus estimates a CFA pattern using a block of 64×64 pixels, the alteration map indicates the possibility of alteration for each block of 64×64 pixels. The possibility of alteration is expressed as a numerical value, for example, the ratio between the least square error of G components for each block and a threshold. More specifically, if the least square error of the G components of a given block is "90" and the threshold is "100", the possibility of the block is expressed as a value of 90 (=90÷100×100). A block with the least square error of G components being equal to or more than the threshold is detected as an altered block. Therefore, the larger the numerical value, the higher the possibility of alteration.

For example, an alteration map 1504 like that shown in FIG. 10B is obtained for an altered image 1503. Note that the detection result obtained by alteration detection using a CFA pattern indicates only blocks whose least square errors of G components are equal to or more than the above threshold and numerical values on the alteration map 1504 are equal to or more than 100. Although the detection results do not indicate other blocks, the larger a numerical value on the alteration map 1504, the higher the possibility of alteration. The alteration map is stored in a predetermined area in a memory 103 or the like, together with the detection results, and is used by a region modification unit 205.

The region modification unit 205 modifies an alteration detection region upon limiting an expanded region using an alteration map. That is, the region modification unit 205 prevents unnecessary expansion by excluding any blocks exhibiting low possibilities of alteration on the alteration map from expansion targets. Assume that the threshold for classifying blocks to those exhibiting low possibilities of alteration is "50". In the case of the alteration map 1504 shown in FIG. 10B, five blocks whose possibilities of alteration are 85, 75, 65, 60, and 60 are expansion targets, and other blocks are excluded from expansion targets.

Alteration detection processing in the second embodiment will be described with reference to the flowchart of FIG. 11. Note that the same step numbers as those in the first embodiment shown in FIG. 8 denote the same processes in the second embodiment, and a detailed description of them will be omitted.

The external copy detection unit 204 detects an altered region included in the image represented by input image data using a CFA pattern and generates an alteration map (S311).

If the external copy detection unit 204 detects an altered region, the region modification unit 205 decides a block to which modification (expansion in this case) of an alteration detection region is to be applied by referring to the alteration map (S312). That is, the external copy detection unit 204 decides a block whose possibility of alteration exceeds, for example, a threshold of "50" as a block to which modification is to be applied.

The region modification unit 205 then determines whether there is any block to which modification is to be applied (S313). If there is any block to which modification is to be applied, the region modification unit 205 modifies the alteration detection region using the extracted feature amount (S305). That is, in this case, the region modification unit 205 applies the alteration detection region expansion processing shown in FIGS. 17A and 17B to the block decided as a block to which modification is to be applied in step S312.

The region modification unit 205 does not execute the alteration detection region modification (S305) if determining in step S313 that there is no block to which modification is to be applied.

[Reduction of Alteration Detection Region]

The above description has exemplified the case in which an alteration detection region is expanded. The following will exemplify a case in which an alteration detection region is reduced.

As described above, the region modification unit 205 has a function of reducing an alteration detection region 1402 so as to make it more closely match the shape of an altered region 1401. In this case, the region modification unit 205 suppresses an excessive region reduction by limiting target regions for modification processing by referring to an alteration map.

As described above, an alteration map numerically expresses the possibility of alteration of each block. The purpose of reduction processing is to exclude an unaltered region from a detection result. The necessity to exclude a given block from an alteration detection region increases as the block exhibits a smaller numerical value on the alteration map, that is, a lower possibility of alteration.

FIG. 10C shows an example of an alteration map, in which blocks exhibiting numerical values equal to or more than 100 correspond to an alteration detection region. The region modification unit 205 generates an alteration map (FIG. 10D) by normalizing the numerical values of the respective blocks with the maximum numerical value (150 in the case of FIG. 10C) included in the alteration map. The region modification unit 205 performs reduction processing for each block whose normalized value is equal to or less than a predetermined threshold. In other words, reduction processing targets are limited to blocks whose normalized values are equal to or less than the predetermined value.

In addition, if the predetermined threshold is, for example, "70", the region modification unit 205 limits an area to be reduced to 100−70=30% with respect to the area (100%) of an alteration detection region. That is, in the case of FIG. 10D, the region modification unit 205 performs reduction processing for the blocks whose normalized values are "67", "69", and "70" in the order named until the alteration detection region reduces to the limit (70% in this case).

This processing decreases the ratio at which small blocks are excluded from blocks exhibiting high possibilities of alteration and increases the ratio at which small blocks are excluded from blocks exhibiting low possibilities of alteration. This makes it possible to decrease the possibility that small blocks are excluded from blocks exhibiting high possibilities of alteration.

Figure 11:
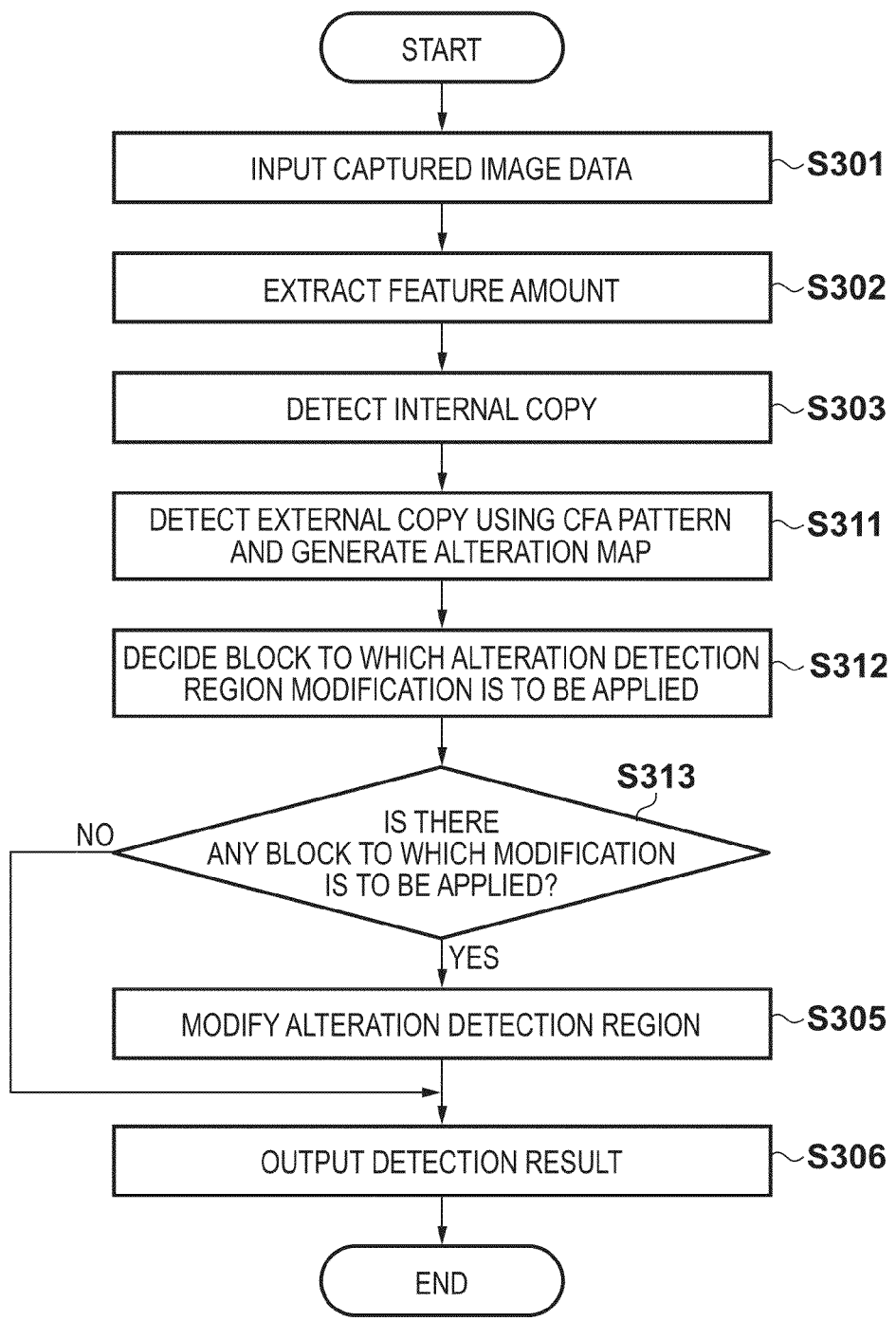
FIG. 11 is a flowchart for explaining alteration detection processing in the second embodiment.

Alteration detection processing of reducing an alteration detection region is the same as that shown in FIG. 11 except for the following point. That is, the region modification unit 205 decides a block to which alteration detection region reduction (modification) processing is to be applied by referring to the alteration map (S312). If there is any block to which reduction processing is to be applied (S313), the region modification unit 205 reduces (modifies) the alteration detection region using extracted feature amounts (S305). That is, in this case, the region modification unit 205 executes the alteration detection region reduction processing shown in FIGS. 18A and 18B for each block decided as a block to which reduction processing is to be applied in step S312.

Upon determining in step S313 that there is no block to which reduction processing is to be applied, the region modification unit 205 executes no alteration detection region modification (S305).

Modification of Embodiments

The first and second embodiments have exemplified the case in which the detection of external copy using a CFA pattern is combined with the detection of internal copy using feature amounts to detect both an external copy and an internal copy. However, it is possible to use only the detection using a CFA pattern. In this case, the apparatus does not perform any processing with the internal copy detection unit 203 but causes the external copy detection unit 204 to perform processing and causes the region modification unit 205 to expand or reduce an alteration detection region using the feature amounts extracted by the feature amount extraction unit 202.

In addition, FIGS. 8 and 11 show the case in which the apparatus detects an external copy after detecting an internal copy. However, the apparatus may detect an internal copy after detecting an external copy.

Furthermore, in the above case, an external copy detection result is sent to the output unit 206 upon being integrated with the modification of an alteration detection region by the region modification unit 205. However, the external copy detection unit 204 may directly send the detection result to the output unit 206. In this case, the region modification unit 205 sends the information of a region added to the alteration detection region or the information of a region excluded from the alteration detection region to the output unit 206. The output unit 206 then outputs the result obtained by integrating the detection result with the region to be added or excluded.

Third Embodiment

An image processing apparatus and image processing method according to the third embodiment of the present invention will be described below. The same reference numerals as in the first and second embodiments denote the same components in the third embodiment, and a detailed description of them will be omitted.

The first and second embodiments have exemplified the case in which an alteration detection region is expanded or reduced to acquire a detection result more closely matching the shape of an altered region. The third embodiment is configured to speed up processing by avoiding double checks on an alteration detection region when external copy detection is combined with internal copy detection.

An alteration detection area detected by external copy detection is a copy region from another image. There is no need to perform internal copy detection in this region. For this reason, the apparatus performs internal copy detection in a region except for the alteration detection region detected by external copy detection. In addition, since internal copy detection requires a long processing time, speeding up this processing will shorten the overall processing time required for the combination of external copy detection and internal copy detection.

[Functional Arrangement]

Figure 12:
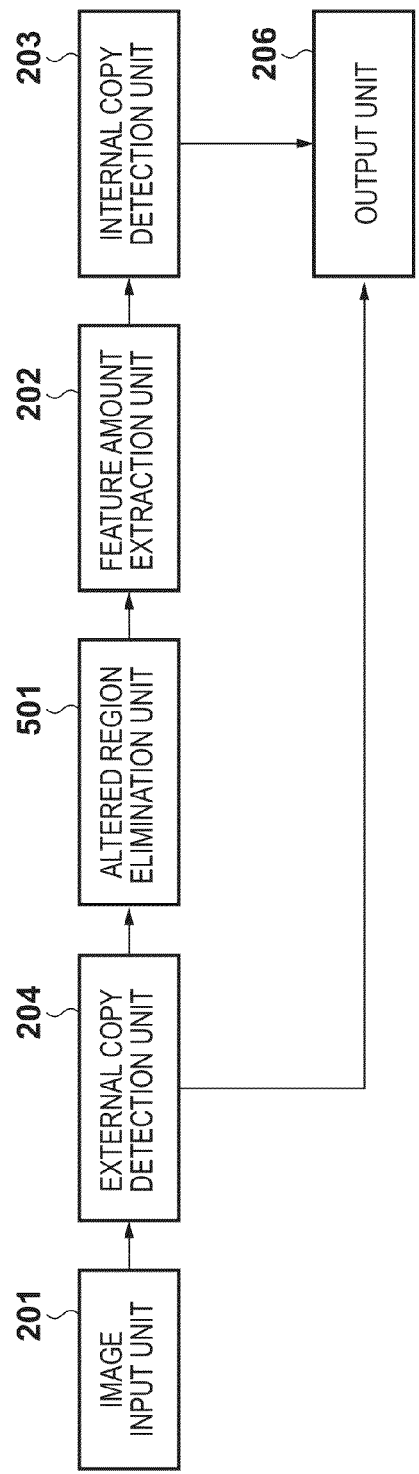
FIG. 12 is a block diagram for explaining the functional arrangement of an image processing apparatus according to the third embodiment.

The functional arrangement of an image processing apparatus 100 according to the third embodiment will be described with reference to the block diagram of FIG. 12. A CPU 101 implements this functional arrangement by executing an image processing program in this embodiment.

Figure 2:
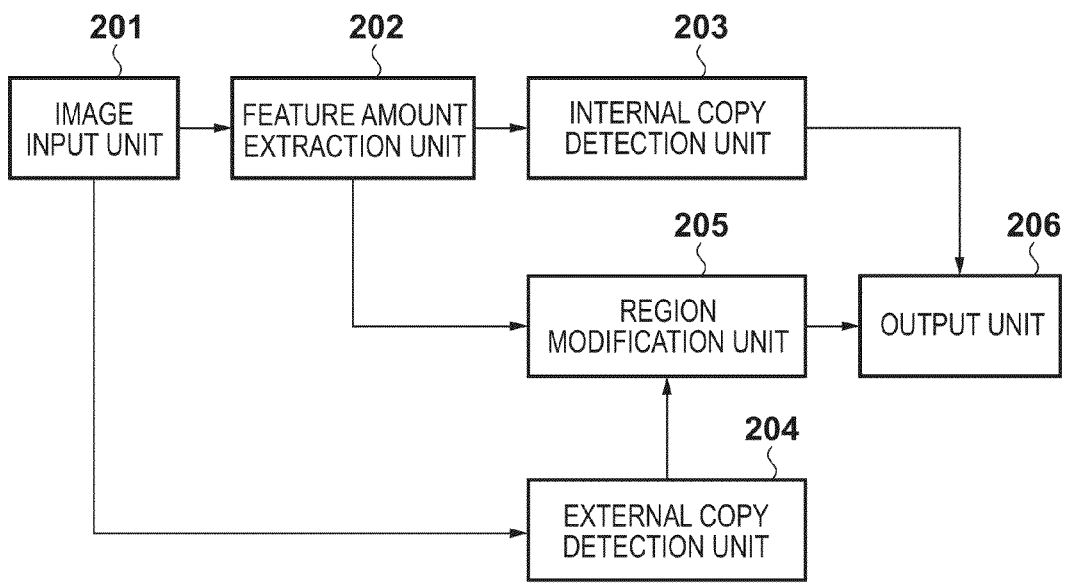
FIG. 2 is a block diagram for explaining the functional arrangement of the image processing apparatus.

This functional arrangement differs from that shown in FIG. 2 in an altered region elimination unit 501. The altered region elimination unit 501 generates image data by eliminating the alteration detection region detected by an external copy detection unit 204 from the image represented by input image data. The generated image data is stored in a predetermined area in a memory 103 or the like and used for processing by a feature amount extraction unit 202.

In a method of generating the image data, for example, the apparatus divides input image data into blocks and excludes blocks corresponding to the alteration detection region detected by the external copy detection unit 204. That is, the external copy detection unit 204 sets the image data of the block to minimum value RGB=(0, 0, 0) or the maximum value (for example, RGB=(255, 255, 255)) of the range. However, this method is an example, and it is possible to use any method which can specify an alteration detection region in input image data and excludes the region from feature amount extraction targets.

[Alteration Detection Processing]

Alteration detection processing in the third embodiment will be described with reference to the flowchart of FIG. 13.

An image input unit 201 inputs the image data of a captured image (S601). The external copy detection unit 204 detects an altered region included in the image represented by the input image data using a CFA pattern (S602).

The altered region elimination unit 501 generates image data by eliminating the alteration detection region detected by the external copy detection unit 204 from the image represented by the input image data (S603). The feature amount extraction unit 202 extracts a feature amount for each block from the image data output from the altered region elimination unit 501 (S604).

An internal copy detection unit 203 detects a copy pair included in the image represented by the image data output from the altered region elimination unit 501 using extracted feature amounts (S605). An output unit 206 outputs the detection results obtained by the internal copy detection unit 203 and the external copy detection unit 204 (S606).

[Use of Alteration Map]

The above description has exemplified the case in which the apparatus eliminates only the alteration detection region detected by the external copy detection unit 204 from input image data. However, there is a region in which the possibility of external copy is high, although the region is not included in the alteration detection region detected by the external copy detection unit 204.

The apparatus therefore determines a block whose value on an alteration map is equal to or more than a predetermined threshold as a block in which the possibility of external copy is high, and eliminates the block from the image represented by the input image data. If, for example, the altered region elimination unit 501 excludes any block whose value on the alteration map is equal to or more than 50, the apparatus excludes five blocks with values of 85, 75, 65, 60, and 60 in the case shown in FIG. 10B.

Figure 13:
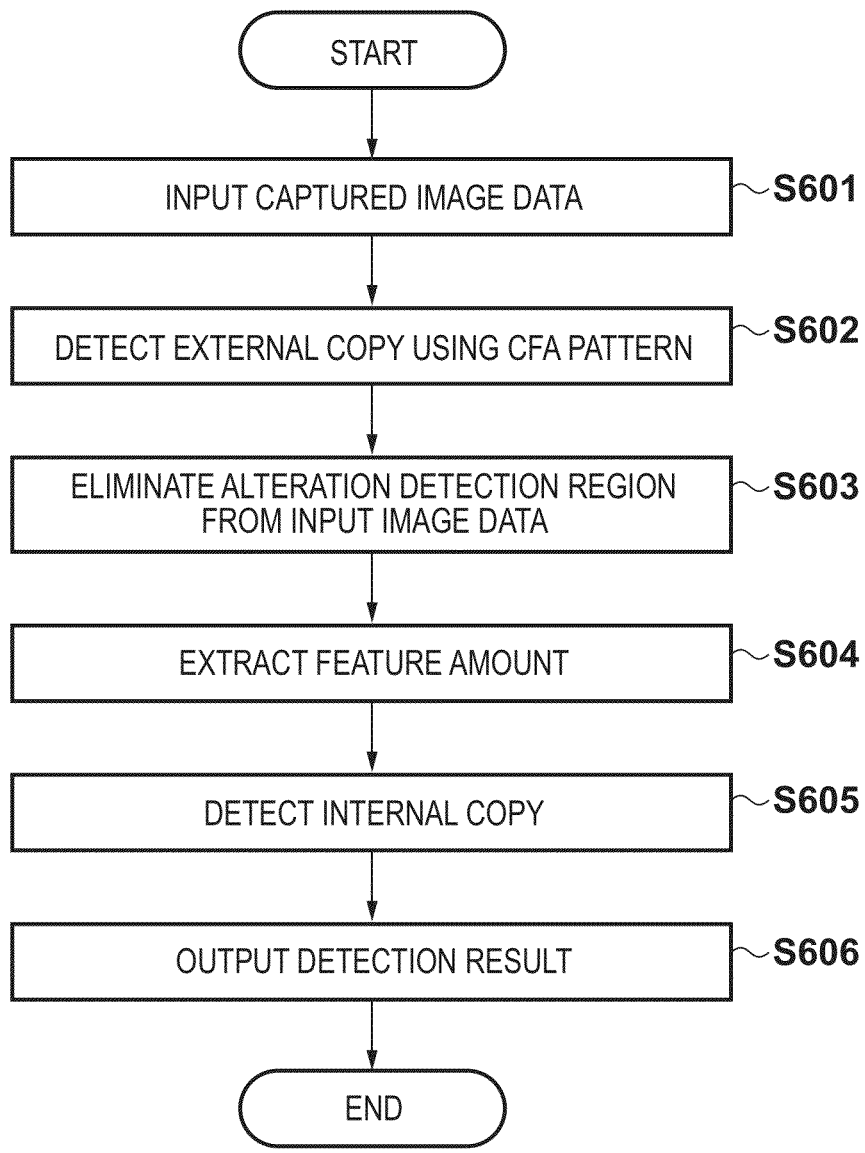
FIG. 13 is a flowchart for explaining alteration detection processing in the third embodiment.

Alteration detection processing using an alteration map is the same as that shown in FIG. 13 except for the following point. That is, the external copy detection unit 204 generates an alteration map while detecting an alteration detection region (S602). The altered region elimination unit 501 generates image data by eliminating an alteration detection area and blocks whose values on the alteration map are equal to or more than a threshold from the image represented by the input image data (S603).

Fourth Embodiment

An image processing apparatus and image processing method according to the fourth embodiment of the present invention will be described below. Note that the same reference numerals as in the first to third embodiments denote the same components in the fourth embodiment, and a detailed description of them will be omitted.

Combining the processing in the first embodiment with the processing in the third embodiment can obtain an alteration detection region more closely matching the shape of an altered region and obtain an alteration detection result at high speed.

[Functional Arrangement]

Figure 14:
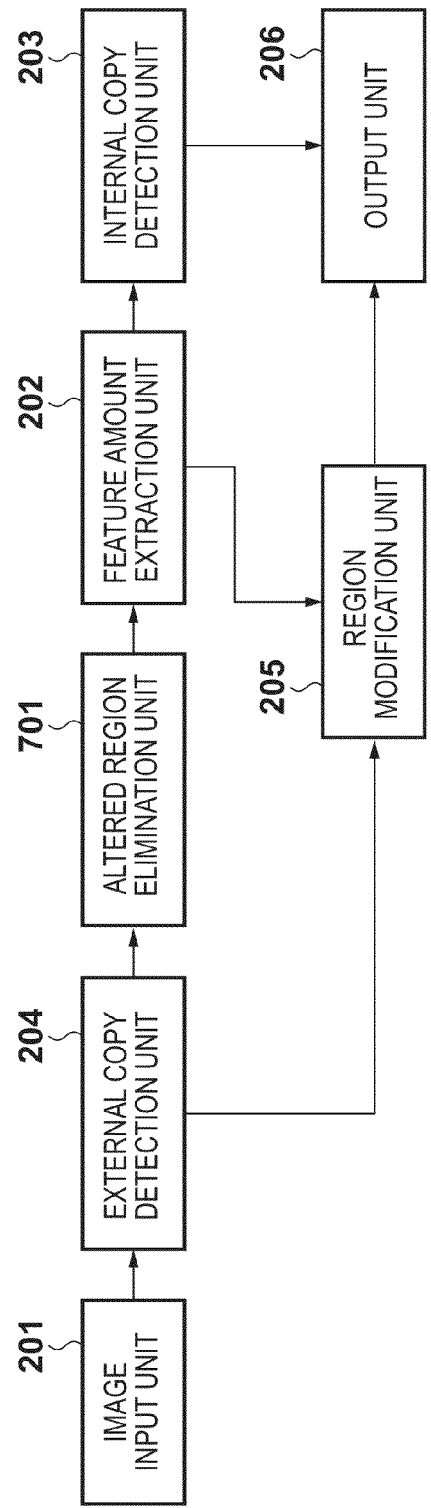
FIG. 14 is a block diagram for explaining the functional arrangement of an image processing apparatus according to the fourth embodiment.

The functional arrangement of an image processing apparatus 100 according to the fourth embodiment will be described with reference to the block diagram of FIG. 14. A CPU 101 implements this functional arrangement by executing an image processing program in this embodiment. Referring to FIG. 14, functions other than an altered region elimination unit 701 are the same as those described in the first to third embodiments.

The altered region elimination unit 701 generates image data by eliminating the alteration detection region detected by an external copy detection unit 204 from the image represented by input image data. In this case, the altered region elimination unit 701 does not eliminate any block for the extraction of a feature amount necessary for the modification of the alteration detection region.

As described in the first embodiment, the apparatus uses the feature amount of a small block 1303 (see FIG. 7B) inside the boundary of the alteration detection region detected by the external copy detection unit 204 for expansion processing. As in the case of an altered region elimination unit 501 in the third embodiment, eliminating all regions unnecessary for internal copy detection will eliminate a region corresponding to the small block 1303. Therefore, the altered region elimination unit 701 in the fourth embodiment eliminates a hatched portion 1306 shown in FIG. 7E without eliminating a region (to be referred to as a "boundary portion" hereinafter) corresponding to the small block 1303 inside the boundary of the alteration detection region. With this operation, a feature amount extraction unit 202 extracts the feature amount of the boundary portion to allow a region modification unit 205 to perform modification processing.

When reducing an alteration detection region, it is only possible to exclude a boundary portion left without being eliminated. When, for example, all the small blocks 1303 on the boundary portion are removed, the region modification unit 205 performs processing such as causing the feature amount extraction unit 202 to extract the feature amounts of small blocks located further inside than the region corresponding to the small blocks 1303 from the input image data. Note that it is possible to limit how far inside the alteration detection region reduction processing is repeated by allowing designation of the upper limit of the number of times the feature amounts of small blocks located inside are extracted.

[Alteration Detection Processing]

Figure 15:
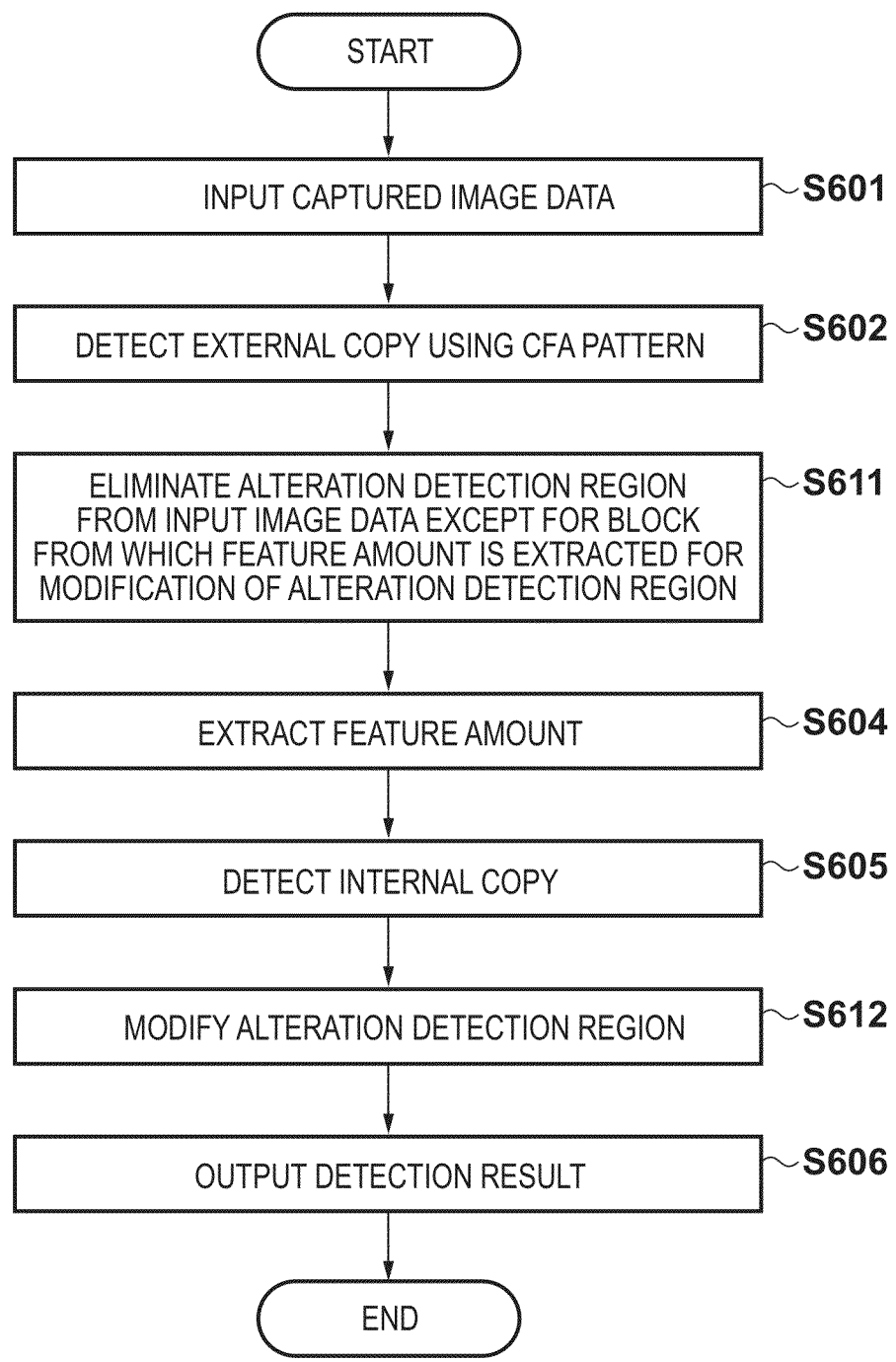
FIG. 15 is a flowchart for explaining alteration detection processing in the fourth embodiment.

Alteration detection processing in the fourth embodiment will be described with reference to the flowchart of FIG. 15. Note that the same step numbers as those in the third embodiment shown in FIG. 13 denote the same processes in the fourth embodiment, and a detailed description of them will be omitted.

The altered region elimination unit 701 eliminates an alteration detection region from input image data except for blocks (the small blocks 1303 shown in FIG. 7B) from which feature amounts are extracted for the modification of the alteration detection region (S611). The region modification unit 205 modifies the alteration detection region (S612).

[Use of Alteration Map]

Although the combination of the first and third embodiments has been described above, it is possible to combine the second embodiment with the third embodiment. That is, it is possible to limit the modification of an alteration detection region using an alteration map.

Figure 16:
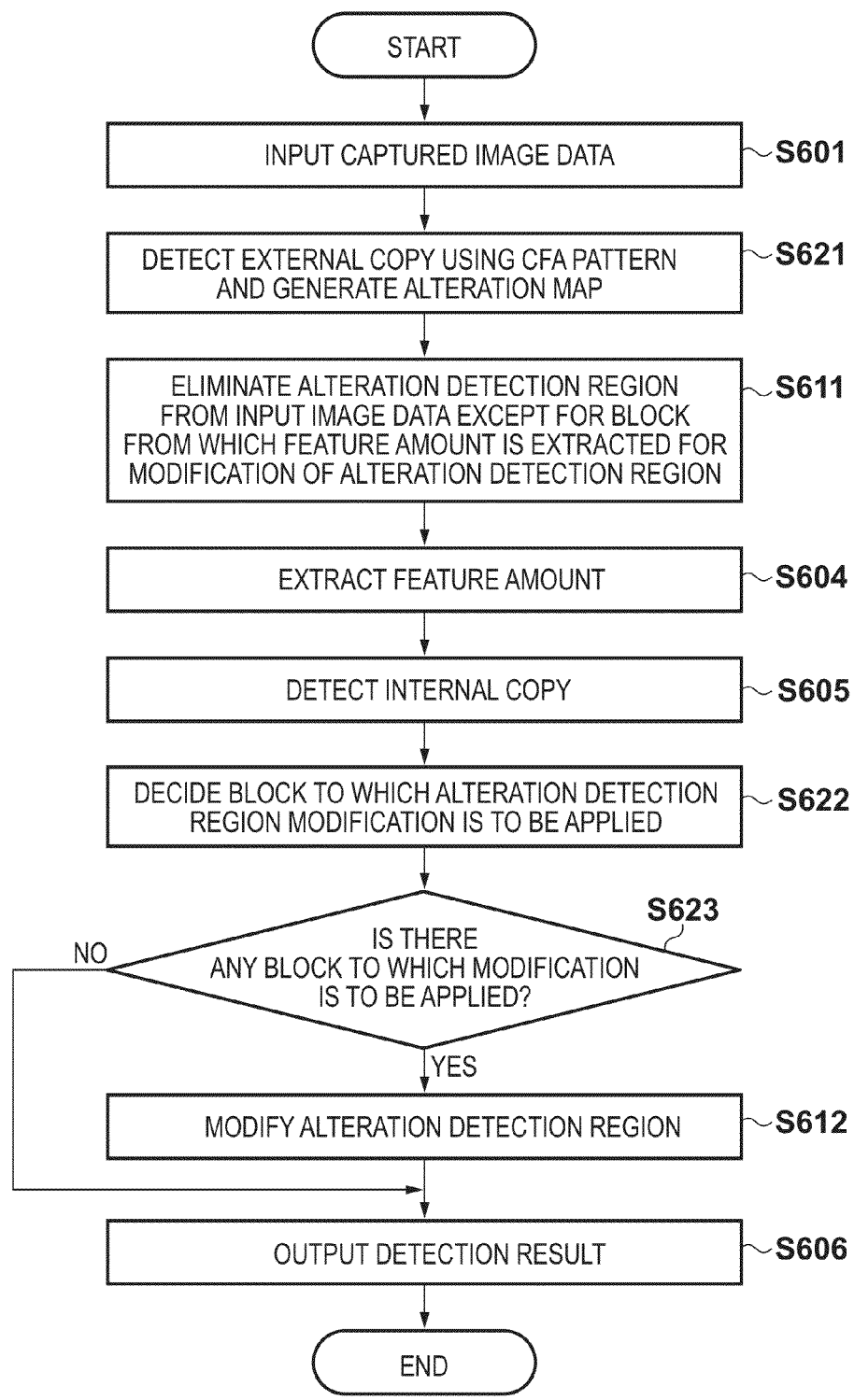
FIG. 16 is a flowchart for explaining another alteration detection processing in the fourth embodiment.

Different alteration detection processing in the fourth embodiment will be described with reference to the flowchart of FIG. 16. Note that the same step numbers as those in FIG. 15 denote the same processes in the fourth embodiment, and a detailed description of them will be omitted.

The external copy detection unit 204 detects an altered region included in the image represented by input image data using a CFA pattern and generates an alteration map (S621). The region modification unit 205 decides a block to which the modification of an alteration detection region is applied by referring to the alteration map (S622). If there is any block to which the modification is to be applied (S623), the region modification unit 205 modifies the alteration detection region (S612). That is, in this case, the region modification unit 205 executes alteration detection region modification processing for each block decided as a block to which modification is to be applied in step S622.

Modification of Embodiments

Elimination of Small Blocks

The fourth embodiment has exemplified the case in which the altered region elimination unit 701 does not eliminate the small blocks 1303 required for the modification of an alteration detection region. However, when modifying an alteration detection region after the small blocks 1303 are also eliminated, the apparatus may cause the feature amount extraction unit 202 to extract feature amounts of necessary regions from the input image data stored in a memory 103 or the like.

Detection Accuracy and Processing Speed

In the fourth embodiment, when higher importance is placed on the speeding up of processing than the detection accuracy of an altered region, it is possible to perform internal copy detection upon eliminating the entire alteration detection region detected by the external copy detection unit 204 by skipping region modification processing by the region modification unit 205. In this case, no feature amounts required for region modification are extracted, and hence the alteration detection region detected by the external copy detection unit 204 is not modified (expanded or reduced). If, for example, the region detected by the external copy detection unit 204 is large, there are many blocks from which feature amounts required for expansion/reduction are extracted, leading to an increase in processing time. However, skipping region modification processing requires the execution of only region elimination and eliminates the necessity to extract feature amounts for modification processing. Therefore, this makes it possible to speed up processing to the maximum.

In addition, if the region size detected by the external copy detection unit 204 is equal to or more than a predetermined size, region modification processing is skipped, whereas if the region size is less than a predetermined size, region modification processing is executed. This makes it possible to dynamically control the skipping of region modification processing. This can effectively control the balance between the detection accuracy of an altered region and the processing speed.

Substitution of CFA Pattern

The first to fourth embodiments have exemplified the case in which a CFA pattern is used to detect an external copy. However, it is also possible to use, for external copy detection, the technique of performing alteration detection processing upon extracting noise unique to the image sensor from image data.

Switching Between Expansion Processing and Reduction Processing

Using the alteration map generated in the second and fourth embodiments can properly switch between expansion processing and reduction processing for an alteration detection region. A case in which switching between expansion processing and reduction processing is applied to the processing in the second embodiment will be described with reference to the flowchart of FIG. 19. Note that the same step numbers as those in the second embodiment shown in FIG. 11 denote the same processes in this modification, and a detailed description of them will be omitted.

When the external copy detection unit 204 detects an altered region and generates an alteration map (S311), the region modification unit 205 acquires one second unit region (to be referred to as the "first block" hereinafter) included in an alteration detection region (S1901). The region modification unit 205 acquires a value P indicating the possibility of alteration in the alteration map corresponding to the first block (S1902), and compares the value P with a threshold Th1 (S1903). The region modification unit 205 also compares the value P with a threshold Th2 (<Th1) (S1904).

If P≥Th1, the region modification unit 205 executes alteration detection region expansion processing for the first block (S1905). If P<Th1 and P≤Th2, the region modification unit 205 executes alteration detection region reduction processing for the first block (S1906). If Th2<P<Th1, the region modification unit 205 does not execute alteration detection region modification processing for the first block (non-modification). Note that expansion processing in step S1905 corresponds to the processing in FIGS. 17A and 17B, and reduction processing in step S1906 corresponds to the processing in FIGS. 18A and 18B.

The region modification unit 205 repeats the above processing (from step S1901 to step S1906) until determining in step S1907 that the above processing (from step S1901 to step S1906) is executed for all the first blocks included in the alteration detection region. That is, the region modification unit 205 switches between expansion processing, reduction processing, and non-modification for each first block in accordance with the possibility of alteration. Since the region modification unit 205 switches between expansion processing, reduction processing, and non-modification for each first block in accordance with the possibility of alteration, it is possible to modify the alteration detection region more properly.

It is obvious that the above switching operation can be applied to the processing in the fourth embodiment. A description of a case in which the above switching operation is applied to the processing in the fourth embodiment will be omitted.

The above switching method is merely an example. For example, the region modification unit 205 may use the following switching method. For example, the region modification unit 205 acquires values indicating the possibilities of alteration on an alteration map corresponding to all the first blocks without determining whether to expand or reduce for each first block (steps S1902 and S1904). The region modification unit 205 then calculates the statistical value (average value or median value) of the acquired values. The region modification unit 205 executes expansion processing, reduction processing, or non-modification for all the first blocks based on the comparison between the statistical value and the thresholds Th1 and Th2.

Detection of Internal Copy

Although the case in which internal copy detection is performed using the feature amount of the first unit region has been described, it is possible to detect an internal copy by determining whether the pixel values of the respective pixels (for example, the luminances or RGB component values) in the first unit region are approximate to each other. In addition, a CFA pattern may be disrupted even in an internal copy. In this case, the external copy detection unit 204 can detect an altered region by internal copy.

Input Image Data

As long as the apparatus detects internal copies, input image data is not limited to captured images.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example through a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-040667 filed Feb. 27, 2012, and No. 2013-009618 filed Jan. 22, 2013, which are hereby incorporated by reference herein in their entirety.

What is claimed is:

1. An image processing apparatus comprising:
a first detector configured to extract a pattern of a color filter array from captured image data for each first unit region, and to detect a first altered region from disturbance of periodicity of the pattern, wherein the first altered region is an image region in which copying has been performed from image data different from the captured image data to the captured image data;
a second detector configured to extract a feature amount of the captured image data for each second unit region different in size from the first unit region, and to compare a feature amount for the each second unit region to detect a second altered region, wherein the second altered region is an image region in which copying has been performed from the captured image data to the captured image data; and
an output section configured to output information concerning the first altered region and information concerning the second altered region as alteration detection results in the captured image data,
wherein the second detector detects the second altered region based on the captured image data from which the first altered region is excluded, and wherein at least one of the first and second detectors is implemented using a processor.

2. The apparatus according to claim 1, further comprising an eliminator configured to generate image data by eliminating image data of the first altered region from the captured image data,
wherein the second detector detects the second altered region by extracting, for the each second unit region, a feature amount of captured image data from which image data of the first altered region is eliminated.

3. The apparatus according to claim 1, wherein a size of the first unit region is larger than a size of the second unit region.

4. The apparatus according to claim 1, further comprising a modifier configured to modify the first altered region using a feature amount of the each second unit region,
wherein the output section outputs information concerning the modified first altered region.

5. The apparatus according to claim 4, wherein the modifier modifies the first altered region based on a comparison result between a feature amount of the each second unit region included in the first altered region and a feature amount of the each second unit region in a region adjacent to the first altered region.

6. The apparatus according to claim 4, wherein the modifier modifies the first altered region based on a result obtained by comparing feature amounts of the respective second unit regions included in the first altered region.

7. An image processing method comprising:
using a processor to perform the steps of:
extracting a pattern of a color filter array from captured image data for each first unit region;
detecting a first altered region from disturbance of periodicity of the pattern, wherein the first altered region is an image region in which copying has been performed from image data different from the captured image data to the captured image data;
extracting a feature amount of the captured image data for each second unit region different in size from the first unit region;
comparing a feature amount for the each second unit region to detect a second altered region, wherein the second altered region is an image region in which copying has been performed from the captured image data to the captured image data; and
outputting information concerning the first altered region and information concerning the second altered region as alteration detection results in the captured image data,
wherein, in the second detecting step, the second altered region is detected based on the captured image data from which the first altered region is excluded.

8. The method according to claim 7, further comprising the step of generating image data by eliminating image data of the first altered region from the captured image data,
wherein, in the second detecting step, the second altered region is detected by extracting, for the each second unit region, a feature amount of captured image data from which image data of the first altered region is eliminated.

9. The method according to claim 7, wherein a size of the first unit region is larger than a size of the second unit region.

10. The method according to claim 7, further comprising the step of modifying the first altered region using a feature amount of the each second unit region,
wherein, in the outputting step, information concerning the modified first altered region is outputted.

11. The method according to claim 10, wherein, in the modifying step, the first altered region is modified based on a comparison result between a feature amount of the each second unit region included in the first altered region and a feature amount of the each second unit region in a region adjacent to the first altered region.

12. The method according to claim 10, wherein, in the modifying step, the first altered region is modified based on a result obtained by comparing feature amounts of the respective second unit regions included in the first altered region.

13. A non-transitory computer readable medium storing a computer-executable program for causing a processor to perform an image processing method, the method comprising the steps of:
extracting a pattern of a color filter array from captured image data for each first unit region;
detecting a first altered region from disturbance of periodicity of the pattern, wherein the first altered region is an image region in which copying has been performed from image data different from the captured image data to the captured image data;
extracting a feature amount of the captured image data for each second unit region different in size from the first unit region;
comparing a feature amount for the each second unit region to detect a second altered region, wherein the second altered region is an image region in which copying has been performed from the captured image data to the captured image data; and
outputting information concerning the first altered region and information concerning the second altered region as alteration detection results in the captured image data,
wherein, in the second detecting step, the second altered region is detected based on the captured image data from which the first altered region is excluded.

\* \* \* \* \*